US011500596B2

(12) United States Patent
Ogawa

(10) Patent No.: US 11,500,596 B2
(45) Date of Patent: Nov. 15, 2022

(54) INFORMATION PROCESSING APPARATUS THAT MAKES A NOTIFICATION REGARDING A QUANTITY OF A CONSUMABLE BASED ON RESOURCE INFORMATION ACQUIRED FROM AN IMAGE OUTPUT APPARATUS, INFORMATION PROCESSING SYSTEM, AND METHOD

(71) Applicant: Canon Kabushiki Kaisha, Tokyo (JP)

(72) Inventor: Nobuhiro Ogawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/123,491

(22) Filed: Dec. 16, 2020

(65) Prior Publication Data

US 2021/0191673 A1  Jun. 24, 2021

(30) Foreign Application Priority Data

Dec. 18, 2019 (JP) .............................. JP2019-228615
Oct. 22, 2020 (JP) .............................. JP2020-177446

(51) Int. Cl.
G06F 3/12 (2006.01)
G06Q 30/06 (2012.01)
G06Q 10/08 (2012.01)

(52) U.S. Cl.
CPC ............ *G06F 3/1229* (2013.01); *G06F 3/121* (2013.01); *G06F 3/1203* (2013.01);
(Continued)

(58) Field of Classification Search
None
See application file for complete search history.

(56) References Cited

U.S. PATENT DOCUMENTS 7,512,353 B2 * 3/2009 Sato ..................... G06Q 10/087
705/28
11,061,631 B2 * 7/2021 Osuki ................. G06Q 10/087
(Continued)

FOREIGN PATENT DOCUMENTS

| CN | 108616671 A | 10/2018 |
|---|---|---|
| EP | 1363446 A2 | 11/2003 |
| JP | 2003187123 A | 7/2003 |

OTHER PUBLICATIONS

Indian Office Action dated Dec. 24, 2021 in counterpart Indian Patent Application No. 202044054310.

*Primary Examiner* — Henok Shiferaw
(74) *Attorney, Agent, or Firm* — Venable LLP

(57) ABSTRACT

An information processing apparatus comprises: an acquisition unit configured to acquire resource information concerning a remaining amount of a consumable from an image output apparatus; a generation unit configured to generate notification information indicating a quantity or amount of the consumable based on the resource information acquired from the image output apparatus; and a notification unit configured to make a notification of the notification information generated by the generation unit. The acquisition unit acquires the resource information of a plurality of types of consumables from each of a first image output apparatus and a second image output apparatus. The generation unit generates the corresponding notification information for each of the plurality of types based on the acquired resource information. The notification unit makes a notification of the notification information for each of the plurality of types.

16 Claims, 18 Drawing Sheets

(52) U.S. Cl.
CPC ......... *G06F 3/1293* (2013.01); *G06Q 10/087* (2013.01); *G06Q 30/0633* (2013.01); *G06Q 30/0641* (2013.01)

(56) References Cited

U.S. PATENT DOCUMENTS

| | | | | |
|---|---|---|---|---|
| 2002/0071133 | A1* | 6/2002 | Haines | G06K 15/005 358/1.13 |
| 2004/0204986 | A1* | 10/2004 | Shimbori | G06Q 30/0273 705/14.69 |
| 2006/0161658 | A1* | 7/2006 | Noguchi | G03G 15/5079 709/225 |
| 2015/0293727 | A1* | 10/2015 | Miyazawa | G06Q 30/0241 358/1.15 |
| 2016/0088591 | A1* | 3/2016 | Kim | H04L 43/12 370/338 |
| 2016/0306596 | A1* | 10/2016 | Yasuda | G06F 3/1294 |
| 2018/0241833 | A1* | 8/2018 | Hachiya | H04L 67/146 |
| 2018/0349835 | A1* | 12/2018 | Ishida | G06Q 10/087 |
| 2019/0056894 | A1* | 2/2019 | Hasegawa | G06F 3/1209 |
| 2019/0146733 | A1* | 5/2019 | Park | G06F 3/1203 358/1.15 |
| 2020/0201230 | A1* | 6/2020 | Ohta | G03G 15/5079 |
| 2020/0225885 | A1* | 7/2020 | Akimoto | G06F 3/1219 |

* cited by examiner

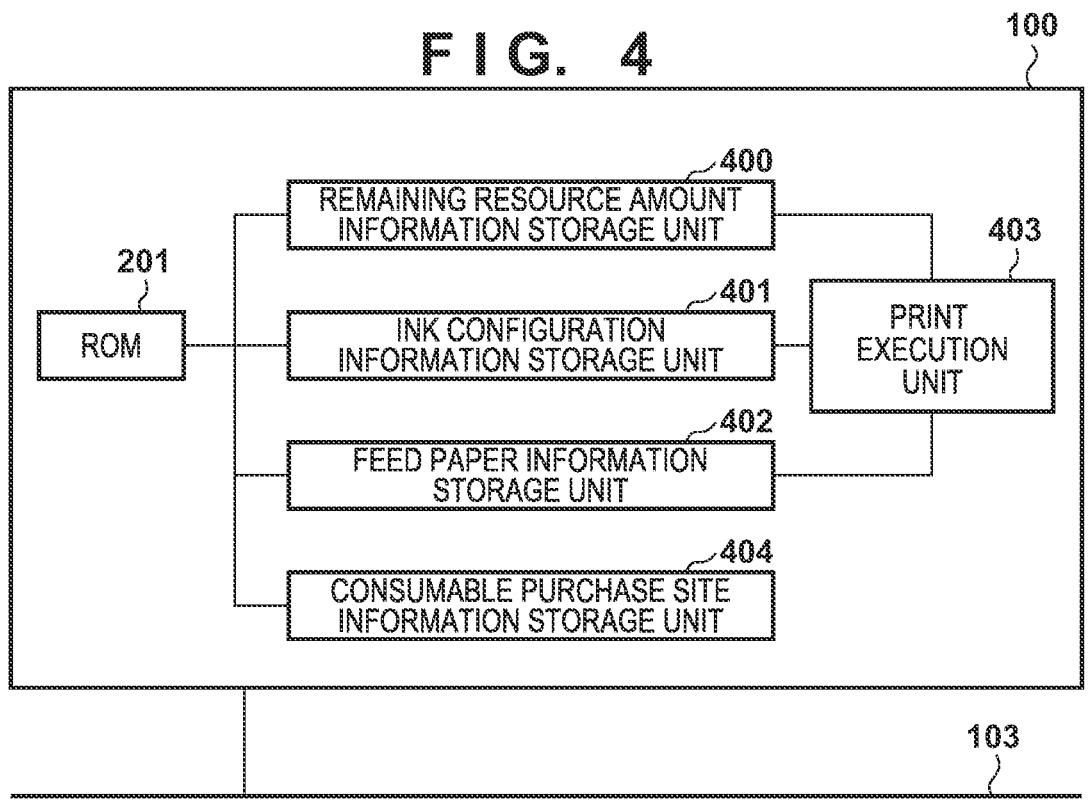
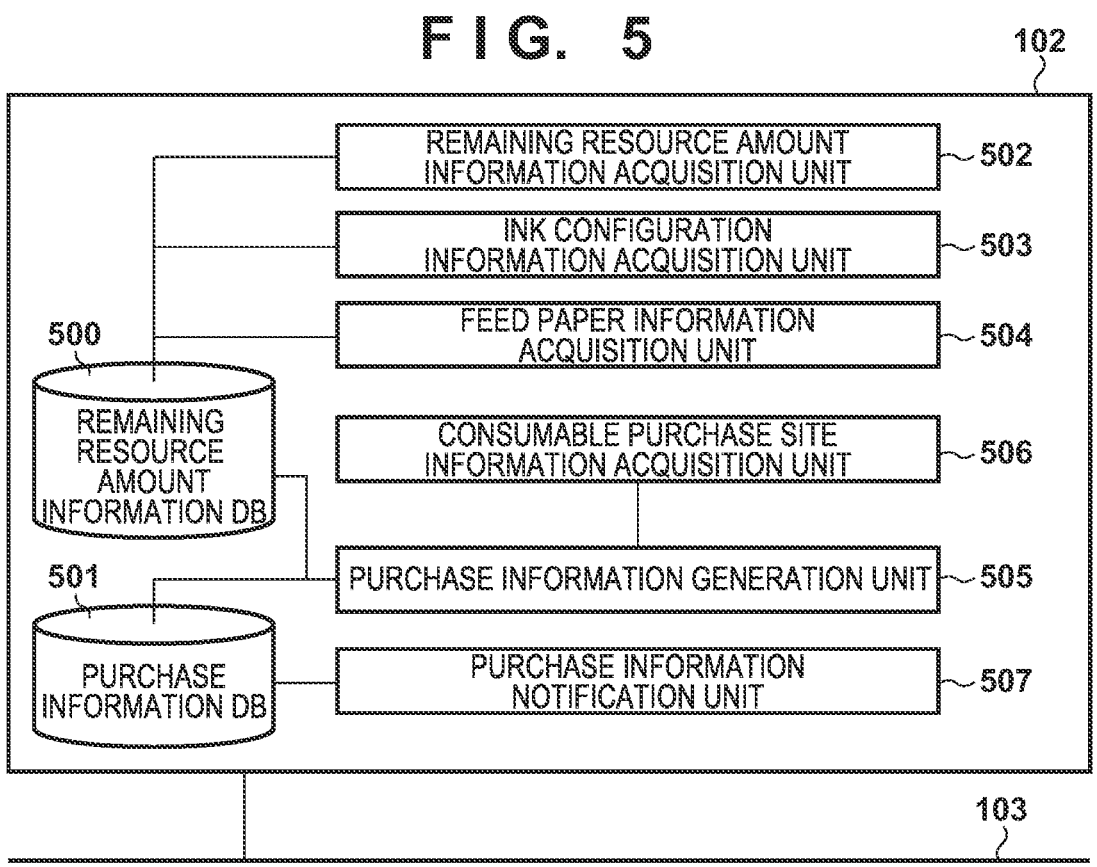

FIG. 6

| ID | RESOURCE CATEGORY | RESOURCE NAME | IMAGE OUTPUT APPARATUS IDENTIFICATION INFORMATION | INK CONFIGURATION INFORMATION | SIZE | REMAINING RESOURCE AMOUNT |
|---|---|---|---|---|---|---|
| RESOURCE ID -A | PAPER | PLAIN PAPER | PRINTER 1 | 12 COLORS (MBK/PBK/C/M/Y/PC/PM/GY/PGY/R/B/CO) | 24 inch | SMALL :3m |
| RESOURCE ID -B | PAPER | PHOTO PAPER | PRINTER 1 | 12 COLORS (MBK/PBK/C/M/Y/PC/PM/GY/PGY/R/B/CO) | 36 inch | SMALL :2m |
| RESOURCE ID -C | PAPER | PHOTO PAPER | PRINTER 2 | 12 COLORS (MBK/PBK/C/M/Y/PC/PM/GY/PGY/R/B/CO) | 24 inch | SMALL :2m |
| RESOURCE ID -D | PAPER | PHOTO PAPER | PRINTER 2 | 12 COLORS (MBK/PBK/C/M/Y/PC/PM/GY/PGY/R/B/CO) | 36 inch | SMALL :4m |
| RESOURCE ID -E | PAPER | PLAIN PAPER | PRINTER 3 | 8 COLORS (MBK/PBK/C/M/Y/PC/PM/GY) | 36 inch | SMALL :5m |
| RESOURCE ID -F | INK | INK-Y | PRINTER 1 | 12 COLORS (MBK/PBK/C/M/Y/PC/PM/GY/PGY/R/B/CO) | 330ml | SMALL :10ml |
| RESOURCE ID -G | INK | INK-C | PRINTER 2 | 12 COLORS (MBK/PBK/C/M/Y/PC/PM/GY/PGY/R/B/CO) | 330ml | SMALL :40ml |
| RESOURCE ID -H | INK | INK-C | PRINTER 2 | 12 COLORS (MBK/PBK/C/M/Y/PC/PM/GY/PGY/R/B/CO) | 700ml | SMALL :20ml |

FIG. 7

| NOTIFICATION ID | NOTIFICATION CONTENTS | CONSUMABLE PURCHASE SITE URL |
|---|---|---|
| NOTIFICATION ID-A | REMAINING PAPER AMOUNT IS LOW.<br>· PLAIN PAPER (24 inch) ONE<br>· PLAIN PAPER (36 inch) ONE | https://store.jp/online/ |
| NOTIFICATION ID-B | REMAINING PAPER AMOUNT IS LOW.<br>· PHOTO PAPER (36 inch) TWO<br>· PHOTO PAPER (24 inch) ONE | https://store.jp/online/ |
| NOTIFICATION ID-C | INK LEVEL IS LOW. (12-COLOR APPARATUS)<br>· Y (330ml) ONE<br>· C (330ml) ONE | https://store.jp/online/ |
| NOTIFICATION ID-D | INK LEVEL IS LOW. (8-COLOR APPARATUS)<br>· C (700ml) ONE | https://store.jp/online/ |

FIG. 8A

```
SENDER :system@test.co.jp  ~801
DESTINATION :user@test.co.jp  ~802
SUBJECT :NOTIFICATION OF PURCHASE INFORMATION  ~803
```
~800

```
< PURCHASE INFORMATION TALLY RESULT >
PURCHASE DESTINATION URL : https://store.jp
REMAINING PAPER AMOUNT IS LOW.
·PLAIN PAPER (24 inch) ONE
·PLAIN PAPER (36 inch) ONE REMAINING PAPER AMOUNT IS LOW.
·PHOTO PAPER (36 inch) TWO
·PHOTO PAPER (24 inch) ONE
```
~804

FIG. 8B

```
SENDER :system@test.co.jp  ~801
DESTINATION :user@test.co.jp  ~802
SUBJECT :NOTIFICATION OF PURCHASE INFORMATION  ~803
```
~800

```
< PURCHASE INFORMATION TALLY RESULT >
PURCHASE DESTINATION URL : https://store.jp
REMAINING PAPER AMOUNT IS LOW.
·PLAIN PAPER (24 inch) ONE
·PLAIN PAPER (36 inch) ONE REMAINING PAPER AMOUNT IS LOW.
·PHOTO PAPER (36 inch) TWO
·PHOTO PAPER (24 linch) ONE <PURCHASE INFORMATION TALLY RESULT> PURCHASE DESTINATION URL :
https://store-2.jp
INK LEVEL IS LOW. (12-COLOR APPARATUS )
·Y (330ml) ONE
·C (330ml) ONE INK LEVEL IS LOW. (8-COLOR APPARATUS )
·C (700ml) ONE
```
~805

FIG. 13

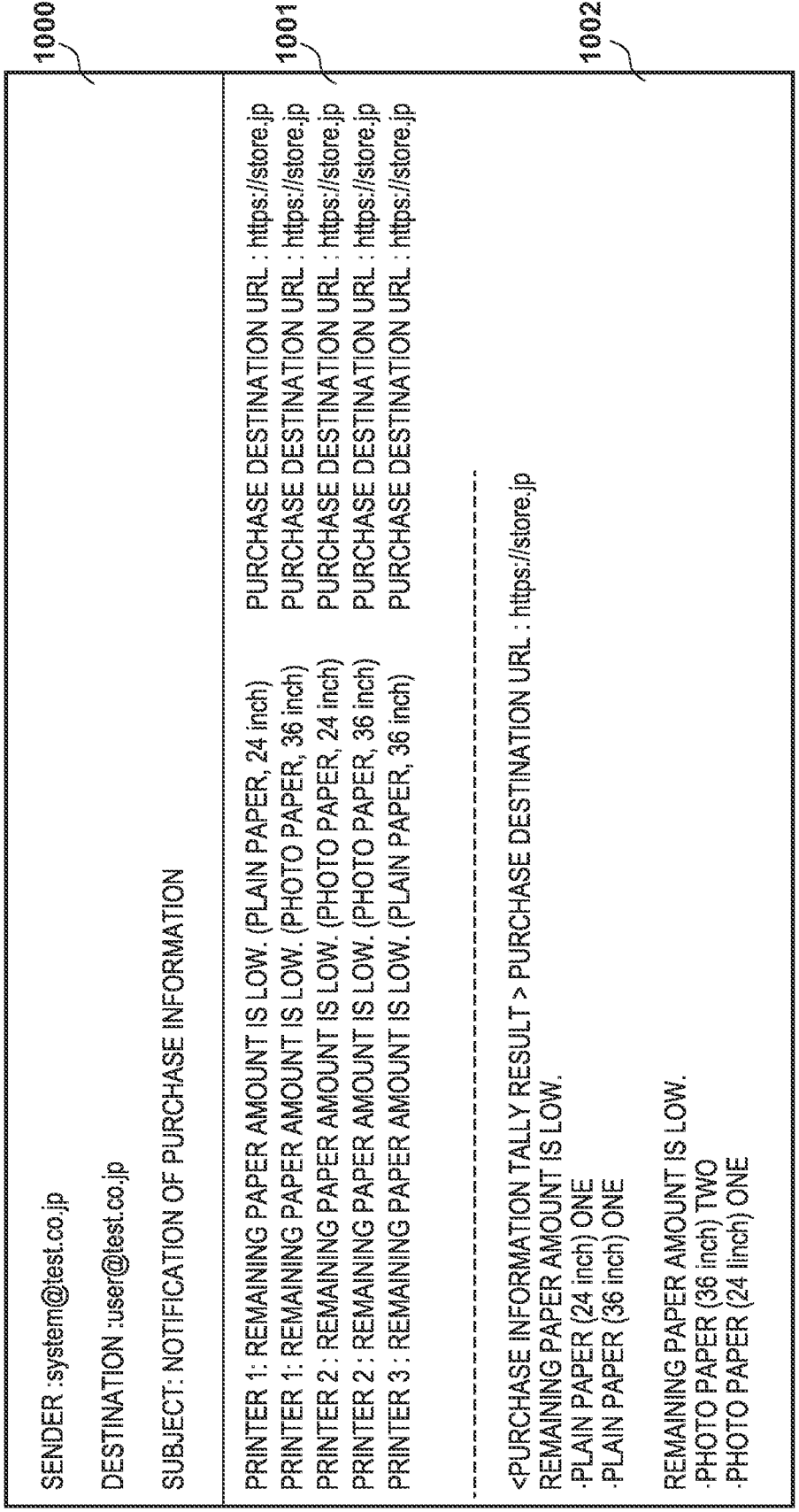

SENDER :system@test.co.jp

DESTINATION :user@test.co.jp

SUBJECT: NOTIFICATION OF PURCHASE INFORMATION

PRINTER 1 : REMAINING PAPER AMOUNT IS LOW. (PLAIN PAPER, 24 inch)   PURCHASE DESTINATION URL : https://store.jp
PRINTER 1 : REMAINING PAPER AMOUNT IS LOW. (PHOTO PAPER, 36 inch)   PURCHASE DESTINATION URL : https://store.jp
PRINTER 2 : REMAINING PAPER AMOUNT IS LOW. (PHOTO PAPER, 24 inch)   PURCHASE DESTINATION URL : https://store.jp
PRINTER 2 : REMAINING PAPER AMOUNT IS LOW. (PHOTO PAPER, 36 inch)   PURCHASE DESTINATION URL : https://store.jp
PRINTER 3 : REMAINING PAPER AMOUNT IS LOW. (PLAIN PAPER, 36 inch)   PURCHASE DESTINATION URL : https://store.jp <PURCHASE INFORMATION TALLY RESULT > PURCHASE DESTINATION URL : https://store.jp
REMAINING PAPER AMOUNT IS LOW.
·PLAIN PAPER (24 inch) ONE
·PLAIN PAPER (36 inch) ONE REMAINING PAPER AMOUNT IS LOW.
·PHOTO PAPER (36 inch) TWO
·PHOTO PAPER (24 inch) ONE

FIG. 20

| ID | RESOURCE CATEGORY | RESOURCE NAME | IMAGE OUTPUT APPARATUS IDENTIFICATION INFORMATION | INK CONFIGURATION INFORMATION | SIZE | REMAINING RESOURCE AMOUNT | STOCK QUANTITY |
|---|---|---|---|---|---|---|---|
| RESOURCE ID -A | PAPER | PLAIN PAPER | PRINTER 1 | 12 COLORS (MBK/PBK/C/M/Y/PC/PM/GY/PGY/R/B/CO) | 24 inch | SMALL .3m | 1 |
| RESOURCE ID -B | PAPER | PHOTO PAPER | PRINTER 1 | 12 COLORS (MBK/PBK/C/M/Y/PC/PM/GY/PGY/R/B/CO) | 36 inch | SMALL .2m | 2 |
| RESOURCE ID -C | PAPER | PHOTO PAPER | PRINTER 2 | 12 COLORS (MBK/PBK/C/M/Y/PC/PM/GY/PGY/R/B/CO) | 24 inch | SMALL .2m | 3 |
| RESOURCE ID -D | PAPER | PHOTO PAPER | PRINTER 2 | 12 COLORS (MBK/PBK/C/M/Y/PC/PM/GY/PGY/R/B/CO) | 36 inch | SMALL .4m | 2 |
| RESOURCE ID -E | PAPER | PLAIN PAPER | PRINTER 3 | 8 COLORS (MBK/PBK/C/M/Y/PC/PM/GY) | 36 inch | SMALL .5m | 1 |
| RESOURCE ID -F | INK | INK-Y | PRINTER 1 | 12 COLORS (MBK/PBK/C/M/Y/PC/PM/GY/PGY/R/B/CO) | 330ml | SMALL .10ml | 1 |
| RESOURCE ID -G | INK | INK-C | PRINTER 2 | 12 COLORS (MBK/PBK/C/M/Y/PC/PM/GY/PGY/R/B/CO) | 330ml | SMALL .40ml | 5 |
| RESOURCE ID -H | INK | INK-C | PRINTER 2 | 12 COLORS (MBK/PBK/C/M/Y/PC/PM/GY/PGY/R/B/CO) | 700ml | SMALL .20ml | 10 |

INFORMATION PROCESSING APPARATUS THAT MAKES A NOTIFICATION REGARDING A QUANTITY OF A CONSUMABLE BASED ON RESOURCE INFORMATION ACQUIRED FROM AN IMAGE OUTPUT APPARATUS, INFORMATION PROCESSING SYSTEM, AND METHOD

BACKGROUND OF THE INVENTION

Field of the Invention

The present invention relates to an information processing apparatus for making a notification of consumable information, an information processing system, and a method.

Description of the Related Art

There is provided a technique of ordering a consumable in accordance with the remaining amount of the consumable such as toner/ink or paper used to print a job using an image output apparatus such as a printer. The user can confirm the state of a management target printer using software having a consumable ordering function.

Since there are a number of kinds of consumables used by an image output apparatus, it tends to be cumbersome to perform a consumable purchase operation. Japanese Patent Laid-Open No. 2003-187123 describes a technique of setting an estimated/order quantity while displaying a remaining amount for each consumable in each of a plurality of image output apparatuses.

SUMMARY OF THE INVENTION

Since there is a consumable commonly used by a plurality of image output apparatuses, as the number of image output apparatuses is larger, confirmation with respect to the consumable is more difficult.

The present invention provides an information processing apparatus capable of facilitating confirmation with respect to a consumable used by a plurality of image output apparatuses, an information processing system, and a method.

The present invention in one aspect provides an information processing apparatus capable of communicating with an image output apparatus, comprising: an acquisition unit configured to acquire resource information concerning a remaining amount of a consumable from the image output apparatus; a generation unit configured to generate notification information indicating a quantity or amount of the consumable based on the resource information acquired from the image output apparatus; and a notification unit configured to make a notification of the notification information generated by the generation unit, wherein the acquisition unit acquires the resource information of a plurality of types of consumables from each of a first image output apparatus and a second image output apparatus, the generation unit generates the corresponding notification information for each of the plurality of types based on the acquired resource information, and the notification unit makes a notification of the notification information for each of the plurality of types.

According to the present invention, it is possible to facilitate confirmation with respect to a consumable used by a plurality of image output apparatuses.

Further features of the present invention will become apparent from the following description of exemplary embodiments with reference to the attached drawings.

BRIEF DESCRIPTION OF THE DRAWINGS

FIG. 4 is a block diagram showing the functional block arrangement of the image output apparatus;

FIG. 5 is a block diagram showing the functional block arrangement of the management PC;

FIG. 6 is a table showing a remaining resource amount information DB;

FIG. 7 is a table showing a purchase information DB;

FIGS. 8A and 8B are views each showing a screen displayed in a notification destination terminal;

FIG. 13 is a view showing a screen displayed in a notification destination terminal;

FIG. 20 is a table showing a remaining resource amount information DB;

DESCRIPTION OF THE EMBODIMENTS

Figure 1:
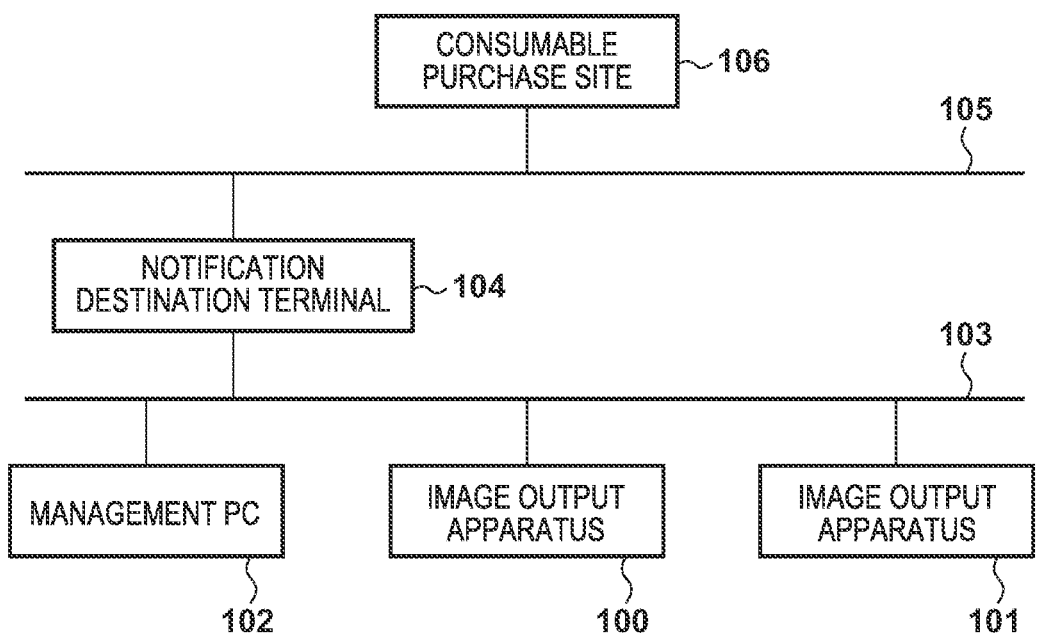
FIG. 1 is a block diagram showing the arrangement of an information processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing system according to this embodiment will be described. The information processing system according to this embodiment is a resource management system for managing resources (consumables) such as ink and paper used by a plurality of image output apparatuses, and the user can perform a purchase operation from a consumable purchase site with respect to the consumables such as ink and paper.

FIG. 1 is a block diagram showing an example of the arrangement of the information processing system. As shown in FIG. 1, a management PC 102 serving as an information processing apparatus can communicate with image output apparatuses 100 and 101 via a network 103. The management PC 102 acquires a name, a size, and remaining amount information concerning each of various resources such as feed paper and an ink tank attached to the image output apparatus 100 or 101. The management PC 102 generates purchase information (notification information) which is confirmed by the user to purchase a consumable based on the acquired resource information, and groups the pieces of purchase information for each resource type. The purchase information (notification information) according to this embodiment includes the quantity or amount of the consumable which is considered to be necessary for replenishment, for example, the quantity of the consumable which is required to be replaced in the image output apparatus. Then, in this embodiment, for each consumable type, the required quantity or amount of the consumable is totalized, and the user is notified of it. Based on the notification, the user can confirm the quantity or amount of the consumable which needs to be purchased for each consumable type. Then, the management PC 102 notifies a notification destination terminal 104 such as a PC or a smartphone of the grouped purchase information (notification information). If the purchase information includes link information (access information) such as a URL or an IP address, the notification destination terminal 104 which has received the notification can access a consumable purchase site 106 via a network 105 using the link information.

As an example, this embodiment assumes that two image output apparatuses are provided. The present invention, however, is not limited to this, and one image output apparatus or three or more image output apparatuses may be provided. Furthermore, one management PC 102 is assumed but two or more management PCs may be provided. Note that the image output apparatuses 100 and 101 are printers each for printing an image on a print medium such as paper. In this embodiment, the image output apparatuses 100 and 101 are assumed to be printers each for printing by the inkjet printing method. Note that the image output apparatuses 100 and 101 may be printers each of which adopts another printing method such as an electrophotographic method. Each of the image output apparatuses 100 and 101 can feed various types of paper, and stores resource information concerning the type of feed paper and attached ink.

Figure 2:
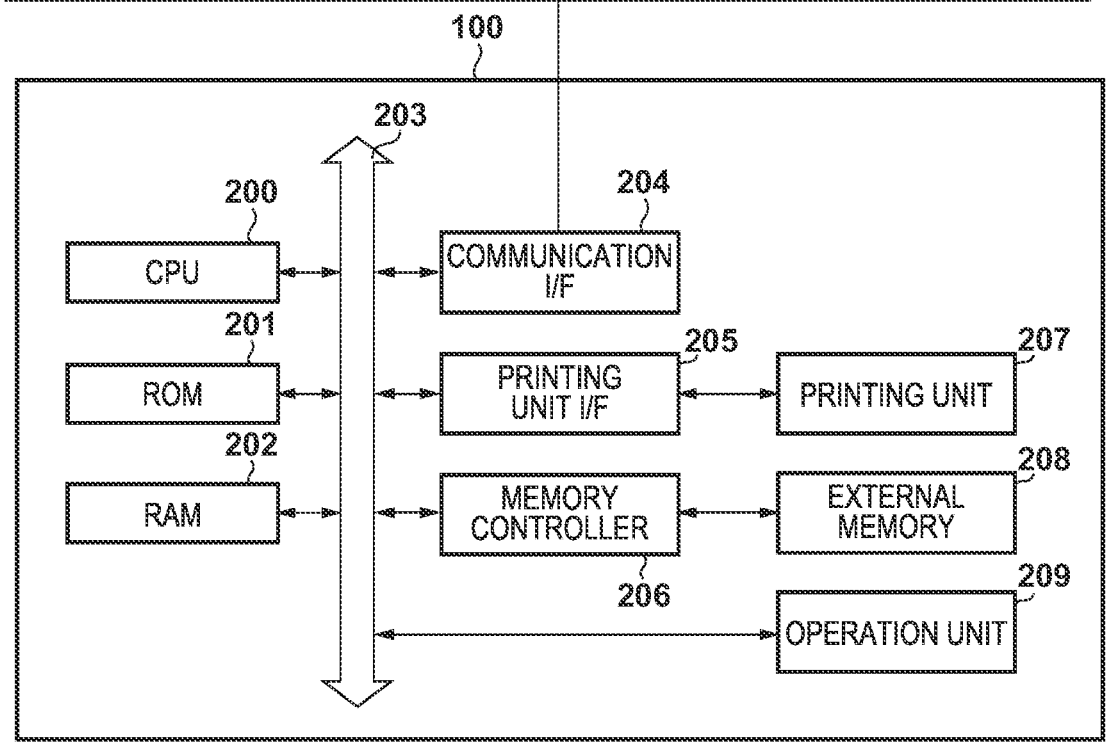
FIG. 2 is a block diagram showing the hardware arrangement of an image output apparatus.

FIG. 2 is a block diagram showing an example of the hardware arrangement of the image output apparatus 100 or 101. Note that the image output apparatuses 100 and 101 have a common arrangement. Unless otherwise specified, the image output apparatus 100 will be described as a representative example of the image output apparatuses 100 and 101.

A CPU 200 generally controls the interior of the image output apparatus 100. The operation of the image output apparatus 100 according to this embodiment is implemented when, for example, the CPU 200 reads out a control program or the like stored in a program ROM of a ROM 201 or a control program or the like stored in an external memory 208 and executes it. The CPU 200 outputs an image signal to a printing unit (printer engine) 207 connected to a printing unit interface (I/F) 205 via a system bus 203. The CPU 200 can execute communication processing with the management PC 102 via a communication I/F 204, and notifies the management PC 102 of, for example, information in the image output apparatus 100. The CPU 200 can externally receive, via the communication I/F 204, data to be output to the printing unit 207 (that is, data to be printed).

A RAM 202 is a RAM functioning as the main memory, the work area, or the like of the CPU 200, and may be configured to expand the memory capacity by an optional RAM connected to an expansion port (not shown). Note that the RAM 202 is used as an environmental data storage area or an output information expansion area in which output information to the printing unit 207 is deployed. Access to the external memory 208 such as a hard disk (HDD) or an IC card is controlled by a memory controller 206. The external memory 208 is optionally connectable, and stores font data, an emulation program, form data, information concerning paper registered in the image output apparatus 100, paper attribute information, and the like. An operation unit 209 includes, for example, a display unit such as a panel, and displays various kinds of information such as a user interface screen.

Figure 3:
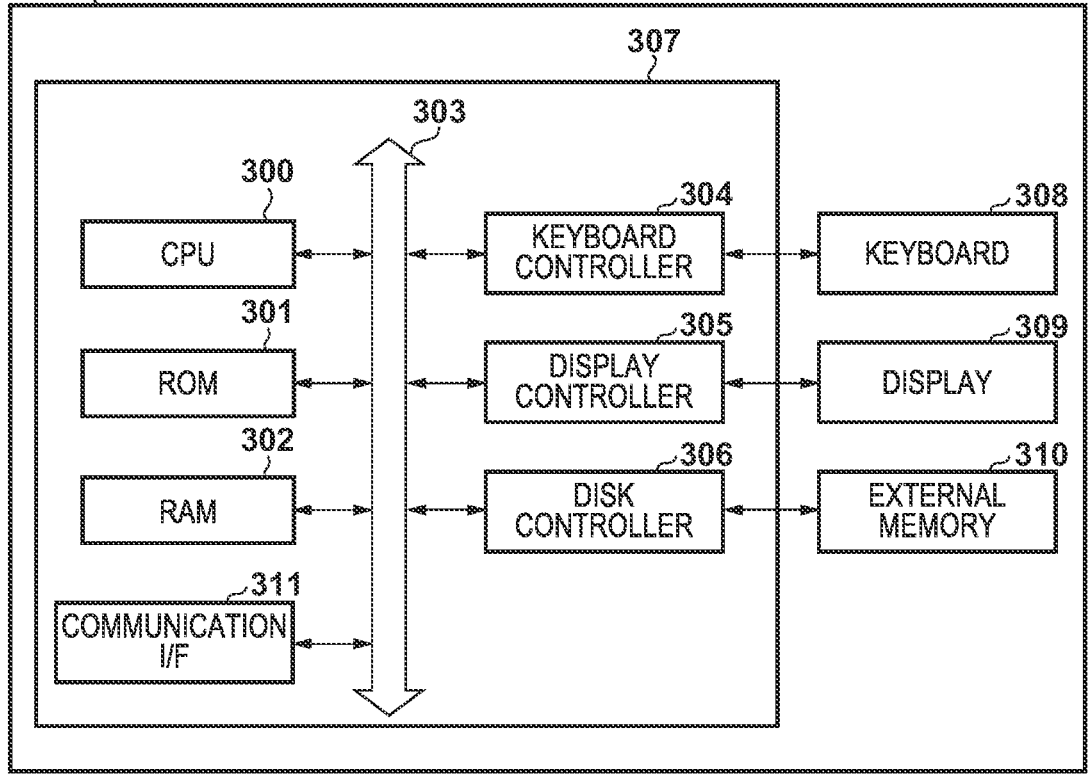
FIG. 3 is a block diagram showing the hardware arrangement of a management PC.

FIG. 3 is a block diagram showing an example of the hardware arrangement of the management PC 102. Note that in this embodiment, each of the notification destination terminal 104 and the consumable purchase site 106 also has the same arrangement as that of the management PC 102. Although the management PC 102 will be described below, the same applies to each of the notification destination terminal 104 and the consumable purchase site 106. A controller 307 is a block for generally controlling the interior of the management PC 102, and includes a CPU 300, a ROM 301, a RAM 302, a keyboard controller 304, a display controller 305, a disk controller 306, and a communication I/F 311.

The CPU 300 controls each unit in the controller 307 connected to a main bus 303. The operation of the management PC 102 according to this embodiment is implemented when, for example, the CPU 300 reads out a control program or the like from an external memory 310 via the disk controller 306, and executes it. The external memory 310 stores various programs such as a control program, a system program, and an application program. The CPU 300 performs display control of a display 309 and data processing by executing, for example, various programs read out into the RAM 302. Furthermore, the CPU 300 may be configured to read out the above-described control program or the like from the ROM 301. Note that the CPU 300 may be a dedicated hardware processor such as an ASIC. The disk controller 306 controls access to the external memory 310 such as an FD, HD, CD-ROM, DVD-ROM, MD, or MO. The RAM 302 is a RAM functioning as the main memory, the work area, or the like of the CPU 300, and may be configured to expand the memory capacity by an optional RAM connected to an expansion port (not shown). The keyboard controller 304 controls key input from a keyboard 308 or a pointing device (not shown). The display controller 305 controls display of the display 309. The CPU 300 can execute communication processing with an external network via the communication I/F 311.

FIG. 4 is a block diagram showing an example of the functional block arrangement of the image output apparatus 100. The ROM 201 includes memory areas of a remaining resource amount information storage unit 400, an ink configuration information storage unit 401, a feed paper information storage unit 402, and a consumable purchase site information storage unit 404.

The ink configuration information storage unit 401 stores information concerning the color types of ink tanks attached to the image output apparatus 100, the number of ink tanks, the sizes (including capacities) of the ink tanks. In this embodiment, the information stored in the ink configuration information storage unit 401 will collectively be referred to as ink configuration information. The feed paper information storage unit 402 stores information concerning the types and sizes of paper fed to the image output apparatus 100. In this embodiment, the information stored in the feed paper information storage unit 402 will collectively be referred to as feed paper information hereinafter. The remaining resource amount information storage unit 400 stores remaining amount information for each of various resources such as ink and paper. In this embodiment, the information stored in the remaining resource amount information storage unit 400 will collectively be referred to as remaining resource amount information hereinafter.

After a job is executed, a print execution unit 403 acquires information (a use amount or the like) concerning a resource used among the various resources stored in the ink configuration information storage unit 401 and the feed paper information storage unit 402, and updates the remaining amount information stored in the remaining resource amount information storage unit 400 for each resource type. The consumable purchase site information storage unit 404 stores information concerning the consumable purchase site 106 such as an explanatory note, link information like an URL, access information, or an IP address. The information in the consumable purchase site information storage unit 404 may be changeable from the outside by a remote UI of the image output apparatus 100, an application of the PC, or the like. A different URL may be set for each consumable type such as ink or paper.

FIG. 5 is a block diagram showing an example of the functional block arrangement of the management PC 102. A remaining resource amount information database (DB) 500 stores remaining resource amount information acquired by a remaining resource amount information acquisition unit 502 from the image output apparatus 100, ink configuration information acquired by an ink configuration information acquisition unit 503 from the image output apparatus 100, and feed paper information acquired by a feed paper information acquisition unit 504 from the image output apparatus 100.

A purchase information generation unit 505 generates purchase information based on information concerning each of various resources acquired from the remaining resource amount information DB 500 and consumable purchase site information acquired by a consumable purchase site information acquisition unit 506 from the image output apparatus 100. The purchase information generation unit 505 registers, in a purchase information DB 501, information obtained by grouping the generated purchase information for each consumable type. A purchase information notification unit 507 sends a notification to the notification destination terminal 104 using the purchase information acquired from the purchase information DB 501.

FIG. 6 is a table showing an example of the remaining resource amount information DB 500. The remaining resource amount information DB 500 includes, as parameters, an ID 600, a resource category 601, a resource name 602, an image output apparatus identification information 603, an ink configuration information 604, a size 605, and a remaining resource amount 606.

The ID 600 is identification information for managing resource information. The resource category 601 is information indicating the category of the resource information, and indicates, for example, whether the resource information is information indicating the type of paper or the type of ink. The resource name 602 is information indicating a resource name, and indicates, for example, plain roll paper (plain paper) or photo roll paper (photo paper). The image output apparatus identification information 603 is information for specifying the image output apparatus 100 as the acquisition source of the source information, and is, for example, address information. The ink configuration information 604 is information indicating the configuration of ink colors used in the image output apparatus 100, and indicates, for example, 12 color inks or eight color inks. The size 605 is information indicating a resource size, and indicates, for example, the width of the roll paper or an ink capacity. The remaining resource amount 606 is information indicating the remaining resource amount, and indicates, for example, the number of sheets in the case of cut paper, a remaining length in the case of roll paper, or a remaining ink amount.

The resource category 601, the resource name 602, the image output apparatus identification information 603, and the size 605 are acquired by the ink configuration information acquisition unit 503 and the feed paper information acquisition unit 504. The ink configuration information 604 is acquired by the ink configuration information acquisition unit 503. The remaining resource amount 606 is acquired by the remaining resource amount information acquisition unit 502. The remaining resource amount information DB 500 may be formed by files or databases for the respective parameters shown in FIG. 6. The remaining resource amount information DB 500 may include a parameter other than the parameters shown in FIG. 6.

As shown in FIG. 6, in the remaining resource amount information DB 500, the pieces of resource information acquired by the remaining resource amount information acquisition unit 502, the ink configuration information acquisition unit 503, and the feed paper information acquisition unit 504 from each image output apparatus 100 are managed. For example, with respect to printer 2 of 12 color inks, the remaining amount of photo roll paper having a 24-inch width, the remaining amount of photo roll paper having a 36-inch width, the remaining amount of C ink with a capacity of 330 mL, and the remaining amount of C ink with a capacity of 700 mL are 2 m, 4 m, 40 mL, and 2 mL, respectively, which are separately managed.

FIG. 7 is a table showing an example of the purchase information DB 501. The purchase information DB 501 identifiably stores purchase information generated based on resource information and consumable purchase site information acquired from one or a plurality of image output apparatuses 100. The purchase information DB 501 includes, as parameters, a notification ID 700, notification contents 701, and a consumable purchase site URL 702.

The notification ID 700 is identification information for managing purchase information. The notification contents 701 indicate information representing notification contents corresponding to the resource information, and store information indicating notification contents grouped based on the resource category 601 to the remaining resource amount 606. For example, pieces of resource information each having the resource name 602 "plain paper" are grouped, and notification data indicating contents "the remaining paper amount is low. •plain paper (24 inches): 1 •plain paper (36 inches): 1" corresponding to the remaining resource amounts 606 is stored. Furthermore, for example, pieces of resource information each having the resource category 601 "ink" and having the size 605 "330 mL" are grouped, and notification data indicating contents "ink level is low (12-color apparatus). •Y (330 mL): 1 •C (330 mL): 1" corresponding to the remaining resource amounts 606 is stored. The consumable purchase site URL 702 is consumable purchase site information held in the consumable purchase site information storage unit 404 of the image output apparatus 100. The consumable purchase site information is acquired by the consumable purchase site information acquisition unit 506.

FIG. 7 shows the same URL as the consumable purchase site URL 702. However, different kinds of consumable purchase site URLs 702 may be stored. Note that it is unnecessary to store a URL as the consumable purchase site URL 702, and any information capable of specifying the consumable purchase site 106 may be stored. The purchase information DB 501 may be formed by files or databases for the respective parameters shown in FIG. 7. The purchase information DB 501 may include a parameter other than the parameters shown in FIG. 7.

As shown in FIG. 7, in the purchase information DB 501, the pieces of resource information are grouped and managed. For example, plain paper (24 inches) and plain paper (36 inches) are grouped as "plain paper" and photo paper (24 inches) and photo paper (36 inches) are grouped as "photo paper". Furthermore, with respect to a printer of 12 color inks, Y ink with a capacity of 330 mL and C ink with a capacity of 330 mL are grouped as "ink with a capacity of 330 mL in the printer of 12 color inks". With respect to a printer of eight color inks, C ink with a capacity of 700 mL is grouped as "ink with a capacity of 700 mL in the printer of eight color inks". That is, each piece of resource information identified by the ID 600 of the remaining resource amount information DB 500 is grouped based on the resource category 601 to the remaining resource amount 606, thereby generating purchase information.

FIG. 8A is view showing an example of a group purchase information screen displayed on the display 309 of the notification destination terminal 104. For example, the management PC 102 makes a notification of the purchase information by an email application. A sender 801, a destination 802, a subject 803, and text 804 are displayed on a screen 800. The sender 801 is information indicating the email address of a sender, and corresponds to, for example, the management PC 102. The destination 802 is information indicating the email address of a destination, and corresponds to, for example, the notification destination terminal 104. The subject 803 is information included in the header information of email, and predetermined contents are displayed as a title. The text 804 is purchase information notified from the management PC 102. In FIG. 8A, the notification contents 701 corresponding to notification ID-A and notification ID-B in FIG. 7 are displayed. In FIG. 8A, the consumable purchase site URL 702 corresponding to notification ID-A and notification ID-B in FIG. 7 is displayed.

In this embodiment, a notification by email has been described. The notification method need not be polling email like email. For example, a notification may be made by push email like a push notification. In FIG. 8A, the information of the consumable purchase site URL 702 is directly displayed in the text 804. However, another display configuration may be used. For example, a button associated with the information of the consumable purchase site URL 702 may be displayed, and when the button is pressed, the consumable purchase site 106 may be accessed. Note that the text 804 may include information other than the purchase information.

Furthermore, if the purchase information notified from the management PC 102 includes a plurality of kinds of consumable purchase site URLs 702, purchase information classified for each consumable purchase site URL 702 is displayed in the text 804. Assume, for example, that the consumable purchase site URL 702 is the same for notification ID-A and notification ID-B, the same for notification ID-C and notification ID-D, and different between notification ID-A and notification ID-C. In this case, the screen 800 shown in FIG. 8B is displayed on the display 309 of the notification destination terminal 104. In text 805, grouped purchase information is displayed for each consumable purchase site URL 702.

An example of the above-described case in which there are a plurality of kinds of consumable purchase site URLs 702 is a case in which a plurality of kinds of consumable purchase site URLs 702 exist in one image output apparatus. Alternatively, a plurality of kinds of consumable purchase site URLs 702 exist in one image output apparatus and another image output apparatus. Assume, for example, that with respect to four image output apparatuses A, B, C, and D, image output apparatuses A and B store URL 1 as the same consumable purchase site URL 702, and image output apparatuses C and D store URL 2 as the same consumable purchase site URL 702. Assume also that for each of URL 1 and URL 2, a plurality of notification IDs 700 of different resource types are assigned. In this case, as in an example shown in the text 805, URL 1 and a necessary purchase quantity for each resource type corresponding to image output apparatuses A and B are displayed. Furthermore, URL 2 and a necessary purchase quantity for each resource type corresponding to image output apparatuses C and D are displayed. That is, as shown in FIG. 8B, the information summarized not for each of image output apparatuses A to D but for each purchase destination URL and each resource type is displayed, thereby making it possible to improve the user convenience when purchasing consumables.

Note that in the examples shown in FIGS. 8A and 8B, an example of making a notification of the quantity of each consumable such as "1" has been explained. However, a notification of the amount of each consumable may be made. If, for example, the image output apparatuses are printers in which ink is injected from a bottle into an ink tank, the amounts of ink to be injected in a plurality of image output apparatuses may be totalized for each ink color, and a notification may be made for each ink color. As a notification method, for example, a notification of "Y total—mL", "C total—mL", and the like is made. In this case as well, the user can determine the number of bottles to be purchased for each ink color.

Figure 9:
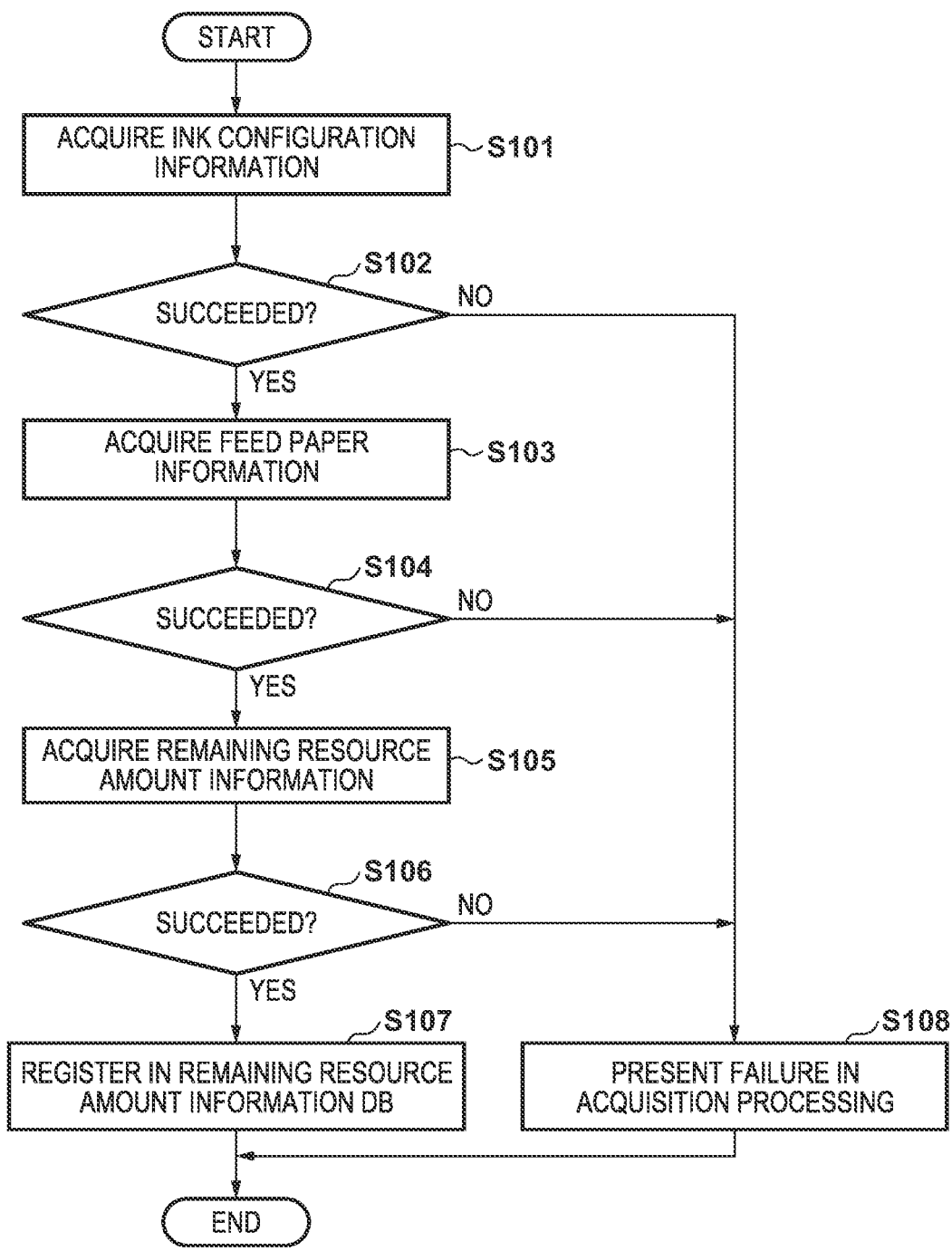
FIG. 9 is a flowchart illustrating processing executed by the management PC.

FIG. 9 is a flowchart illustrating processing of acquiring resource information from the image output apparatus 100, which is executed by the management PC 102. The processing shown in FIG. 9 is implemented when, for example, the CPU 300 reads out a program stored in the ROM 301 into the RAM 302 and executes it. Although the processing of acquiring resource information from the image output apparatus 100 will be described below, processing of acquiring resource information from the other image output apparatus 101 is similarly executed.

In step S101, the CPU 300 acquires, by the ink configuration information acquisition unit 503, ink configuration information held in the ink configuration information storage unit 401 of the image output apparatus 100. In step S102, the CPU 300 determines whether the acquisition of the ink configuration information in step S101 succeeds. If it is determined in step S102 that the acquisition succeeds, the process advances to step S103; otherwise, the CPU 300 notifies, in step S108, the display 309 of a failure in the acquisition of the information of the image output apparatus 100, and then ends the processing shown in FIG. 9.

In step S103, the CPU 300 acquires, by the feed paper information acquisition unit 504, feed paper information held in the feed paper information storage unit 402 of the image output apparatus 100. In step S104, the CPU 300 determines whether the acquisition of the feed paper information in step S103 succeeds. If it is determined in step S104 that the acquisition succeeds, the process advances to step S105; otherwise, the CPU 300 notifies, in step S108, the display 309 of a failure in the acquisition of the information of the image output apparatus 100, and then ends the processing shown in FIG. 9.

In step S105, the CPU 300 acquires, by the remaining resource amount information acquisition unit 502, remaining resource amount information held in the remaining resource amount information storage unit 400 of the image output apparatus 100. In step S106, the CPU 300 determines whether the acquisition of the remaining resource amount information in step S105 succeeds. If it is determined in step S106 that the acquisition succeeds, the process advances to step S107; otherwise, the CPU 300 notifies, in step S108, the display 309 of a failure in the acquisition of the information of the image output apparatus 100, and then ends the processing shown in FIG. 9.

In step S107, the CPU 300 registers, as the remaining resource amount 606, the remaining resource amount information acquired in step S105 in the remaining resource amount information DB 500. The CPU 300 registers, as the resource category 601, the resource name 602, and the size 605, the feed paper information acquired in step S103 in the remaining resource amount information DB 500. The CPU 300 registers, as the resource category 601, the resource name 602, the ink configuration information 604, and the size 605, the ink configuration information acquired in step S101 in the remaining resource amount information DB 500. The information of the image output apparatus as the acquisition source of the resource information is registered in the image output apparatus identification information 603. After step S107, the processing shown in FIG. 9 ends.

Figure 10:
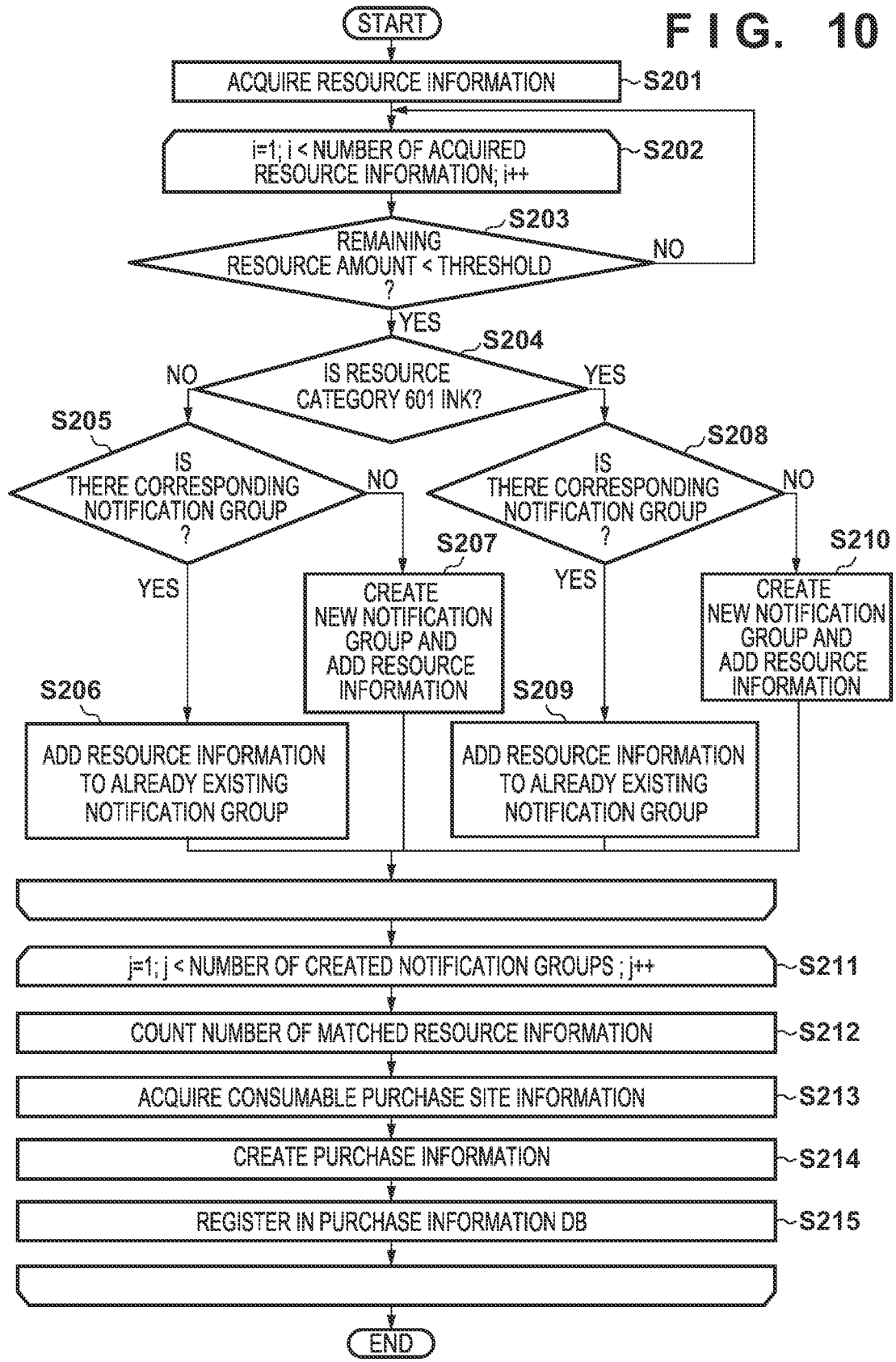
FIG. 10 is a flowchart illustrating processing executed by the management PC.

FIG. 10 is a flowchart illustrating processing of generating purchase information for each group from the resource information, which is executed by the management PC 102. The processing shown in FIG. 10 is implemented when, for example, the CPU 300 reads out a program stored in the ROM 301 into the RAM 302 and executes it.

In step S201, the CPU 300 acquires, by the purchase information generation unit 505, resource information for each ID 600 from the remaining resource amount information DB 500. In step S202, the CPU 300 ensures a variable i corresponding to the total number of IDs 600 in a memory area of the RAM 302 or the like, and sets i=1 as an initial value. That is, the resource information of the first ID 600 is set as a processing target. Processes in steps S203 to S210 are repeated until the variable i is incremented to reach the total number of pieces of resource information acquired in step S201.

In step S203, the CPU 300 determines whether the remaining resource amount 606 included in the resource information acquired in step S201 is smaller than a threshold. If it is determined that the remaining resource amount 606 is smaller than the threshold, the process advances to step S204. If it is determined that the remaining resource amount 606 is not smaller than the threshold (the remaining resource amount 606 is equal to or larger than the threshold), the value of the variable i is incremented, the resource information is excluded from the target of the subsequent processing, and the processing is repeated from step S203.

In step S204, the CPU 300 determines whether the resource category 601 included in the resource information acquired in step S201 is ink. If it is determined that the resource category 601 is ink, the process advances to step S208; otherwise, the process advances to step S205. A case in which it is determined that the resource category 601 is ink will be described first.

In step S208, the CPU 300 determines whether a group, assigned with the notification ID 700, corresponding to the ink configuration information 604 included in the resource information acquired in step S201 already exists in the purchase information DB 501. If it is determined that the corresponding group already exists, the CPU 300 adds, in step S209, the resource information to the group determined to already exist. For example, if the ID 600 of interest is resource ID-H in FIG. 6, a group, assigned with notification ID-C, corresponding to the ink configuration information 604 "12-color" already exists. Therefore, in step S209, the resource information "C ink with a capacity of 700 mL" is added to the group assigned with notification ID-C. After step S209, the CPU 300 increments the variable i in step S202, and repeats the processing from step S203.

If it is determined in step S208 that there is no corresponding group, in step S210 the CPU 300 creates a new notification ID 700 in the purchase information DB 501, and adds the resource information acquired in step S201. After step S210, the CPU 300 increments the variable i in step S202, and repeats the processing from step S203.

A case in which it is determined in step S204 that the resource category 601 is not ink will be described below. In step S205, the CPU 300 determines whether a group, assigned with the notification ID 700, corresponding to the resource name 602 included in the resource information acquired in step S201 already exists in the purchase information DB 501. If it is determined that the corresponding group already exists, the CPU 300 adds, in step S206, the resource information to the group, assigned with the notification ID 700, determined to already exist. For example, if the resource information of the resource ID 600 of interest includes "plain paper (36 inches)", the resource name 602 "plain paper" corresponding to the resource information already exists in the group assigned with notification ID-A in FIG. 7. Therefore, in step S206, the resource information "plain paper (36 inches)" is added to notification ID-A. After step S206, the CPU 300 increments the variable i, and repeats the processing from step S203.

If it is determined in step S205 that there is no corresponding group, in step S207 the CPU 300 creates a new notification ID 700 in the purchase information DB 501, and adds the resource information acquired in step S201. After step S207, the CPU 300 increments the variable i, and repeats the processing from step S203.

If the processes in steps S202 to S210 are executed for all the IDs 600 in the remaining resource amount information DB 500, the process advances to step S211. At this time, a plurality of groups have been created, and processes in steps S212 to S215 are repeatedly executed for the groups.

In step S211, the CPU 300 ensures a variable j corresponding to the total number of groups in a memory area of the RAM 302 or the like, and sets j=1 as an initial value.

That is, the first group is set as a processing target. The processes in steps S212 to S215 are repeated until the variable j is incremented to reach the total number of created groups.

In step S212, the CPU 300 counts the number of matched pieces of resource information for each resource name 602 and each size 605. For example, if the resource information "plain paper (36 inches)" is added to notification ID-A in FIG. 7, it is added to the already existing resource information "plain paper (36 inches) 1", thereby counting "2". Then, in step S213, the CPU 300 acquires, by the consumable purchase site information acquisition unit 506, consumable purchase site information held in the consumable purchase site information storage unit 404 of one of the image output apparatuses linked with the pieces of resource information in the group. If, for example, the counted number of pieces of resource information whose resource name 602 and size 605 are "photo paper" and "36 inches", respectively, are two, the linked image output apparatuses are printers 1 and 2. In this case, the consumable purchase site information held in the consumable purchase site information storage unit 404 of one of printers 1 and 2 is acquired. Note that in this embodiment, the pieces of consumable purchase site information held in the consumable purchase site information storage units 404 of printers 1 and 2 are the same.

In step S214, the CPU 300 creates purchase information (notification information) including the resource name 602, the size 605, the count value in step S212, and the consumable purchase site information acquired in step S213. In step S215, the CPU 300 registers, by the purchase information generation unit 505, the purchase information (notification information) created in step S214 in the purchase information DB 501. After step S215, the CPU 300 increments the variable j in step S211, and repeats the processing from step S212.

If the processes in steps S212 to S215 are executed for all the created groups, the processing shown in FIG. 10 ends. Note that as described above, the quantity of the consumable is totalized in step S204 to S212. However, the present invention is not limited to this, and the amount of the consumable may be totalized. Alternatively, both the quantity and the amount may be totalized. In step S203, the management PC determines whether the remaining amount of the consumable in the image output apparatus is smaller than the threshold. However, the present invention is not limited to this, and each image output apparatus may determine whether the remaining amount is smaller than the threshold. In this case, if the remaining amount is smaller than the threshold, the image output apparatus may transmit, to the management PC, the type of the consumable having a small remaining amount and the quantity (or amount) of the consumable as the resource information concerning the remaining amount of the consumable.

In step S205 of FIG. 10, determination may be performed further based on the size 605. For example, it may be determined in step S205 whether a group corresponding to the resource name 602 and the size 605 already exists in the purchase information DB 501. Furthermore, in step S208 of FIG. 10, determination may be performed further based on the size 605. For example, it may be determined in step S208 whether a group corresponding to the ink configuration information 604 and the size 605 already exists in the purchase information DB 501. Furthermore, a plurality of thresholds for respective remaining amount stages may be provided in step S203, and the resource information in which the remaining resource amount 606 is estimated to become smaller than the threshold when used by a constant amount may be added as purchase information in step S212. With this arrangement as well, the resource information which is estimated to reach the threshold soon can also be set as a purchase target.

Figure 11:
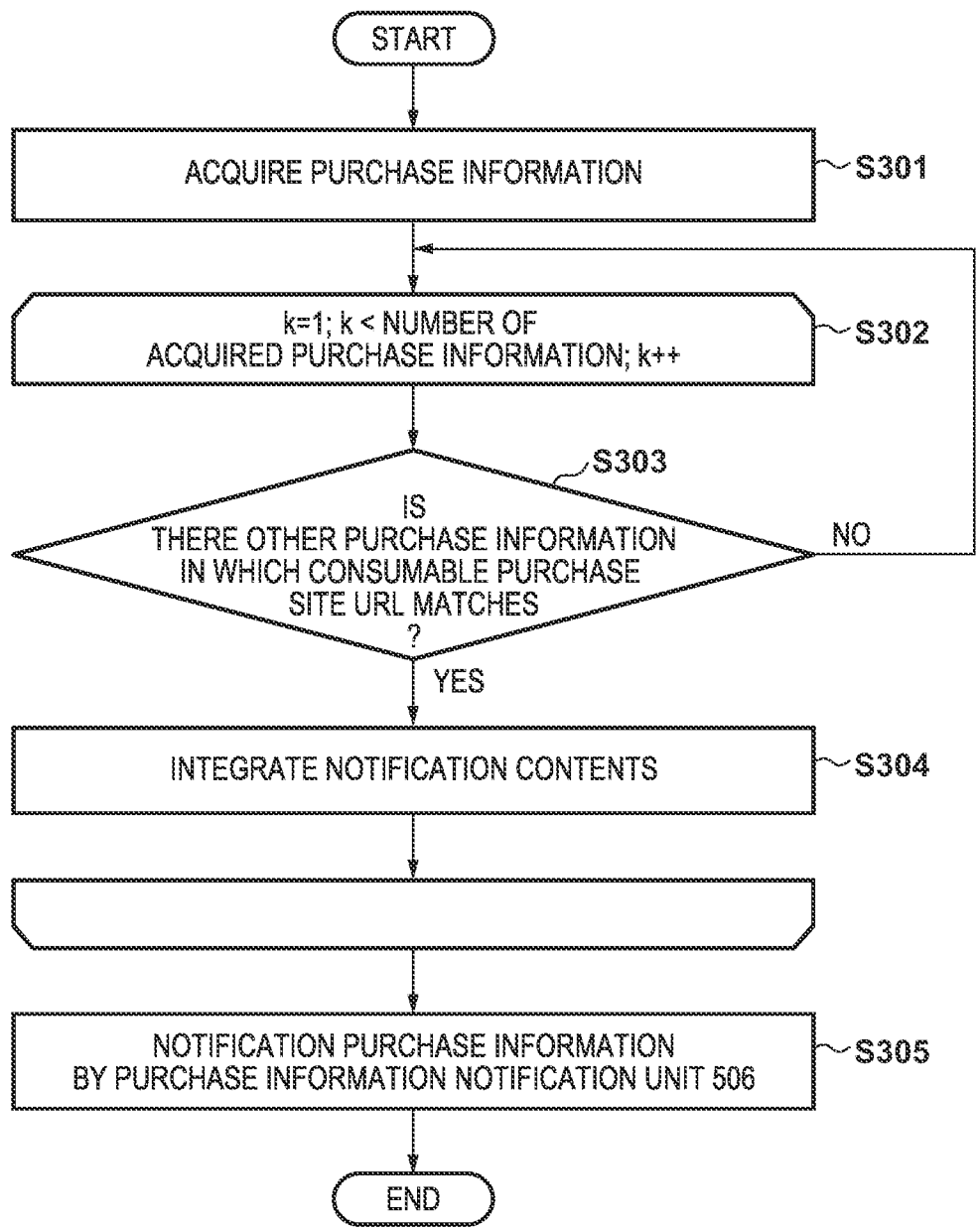
FIG. 11 is a flowchart illustrating processing executed by the management PC.

FIG. 11 is a flowchart illustrating processing of making a notification of purchase information (notification information), which is executed by the management PC 102. The processing shown in FIG. 11 is implemented when, for example, the CPU 300 reads out a program stored in the ROM 301 into the RAM 302 and executes it.

In step S301, the CPU 300 acquires, by the purchase information notification unit 507, a purchase information group from the purchase information DB 501. Processes in steps S303 and S304 are repeatedly executed the number of times corresponding to the total number of pieces of purchase information included in the purchase information group acquired in step S301.

In step S302, the CPU 300 ensures a variable k corresponding to the total number of pieces of purchase information in a memory area of the RAM 302 or the like, and sets k=1 as an initial value. That is, the first piece of purchase information is set as a processing target. In step S303, the CPU 300 determines whether other purchase information in which the consumable purchase site URL 702 matches that included in the purchase information of interest exists in the purchase information group acquired in step S301. If it is determined that there is no other purchase information, the CPU 300 increments the variable k in step S302, and repeats the processing from step S303. If it is determined that there exists the other purchase information, the CPU 300 integrates, in step S304, the notification contents 701 in the other purchase information determined in step S303 to exist. With this arrangement, the information summarized for each purchase destination URL can be presented, as shown in FIGS. 8A and 8B.

If the processes in steps S303 and S304 are executed for all the pieces of purchase information, the CPU 300 notifies, in step S305, the notification destination terminal 104 of the purchase information (notification information) by the purchase information notification unit 507. After that, the processing shown in FIG. 11 ends.

As described above, according to this embodiment, the resource information acquired from each image output apparatus is grouped based on the resource name 602 and the ink configuration information 604, thereby generating purchase information. For example, the resource information is grouped based on the resource name 602 for paper, and the resource information is grouped based on the ink configuration information 604 for ink. In addition, the user is notified of, as purchase information, the information summarized for each consumable purchase site URL, thereby making it possible to improve the user convenience when purchasing resources.

Second Embodiment

In this embodiment, points different from the first embodiment will be described below. In the first embodiment, the notification contents 701 are integrated in step S304 of FIG. 11, and a notification of the purchase information grouped for each consumable purchase site URL 702 is collectively made. In this embodiment, processing in step S305 is executed after step S301 without executing steps S302 to S304 in processing shown in FIG. 11, and a notification of purchase information is made in step S305 for each group assigned with a notification ID 700.

Figure 12:
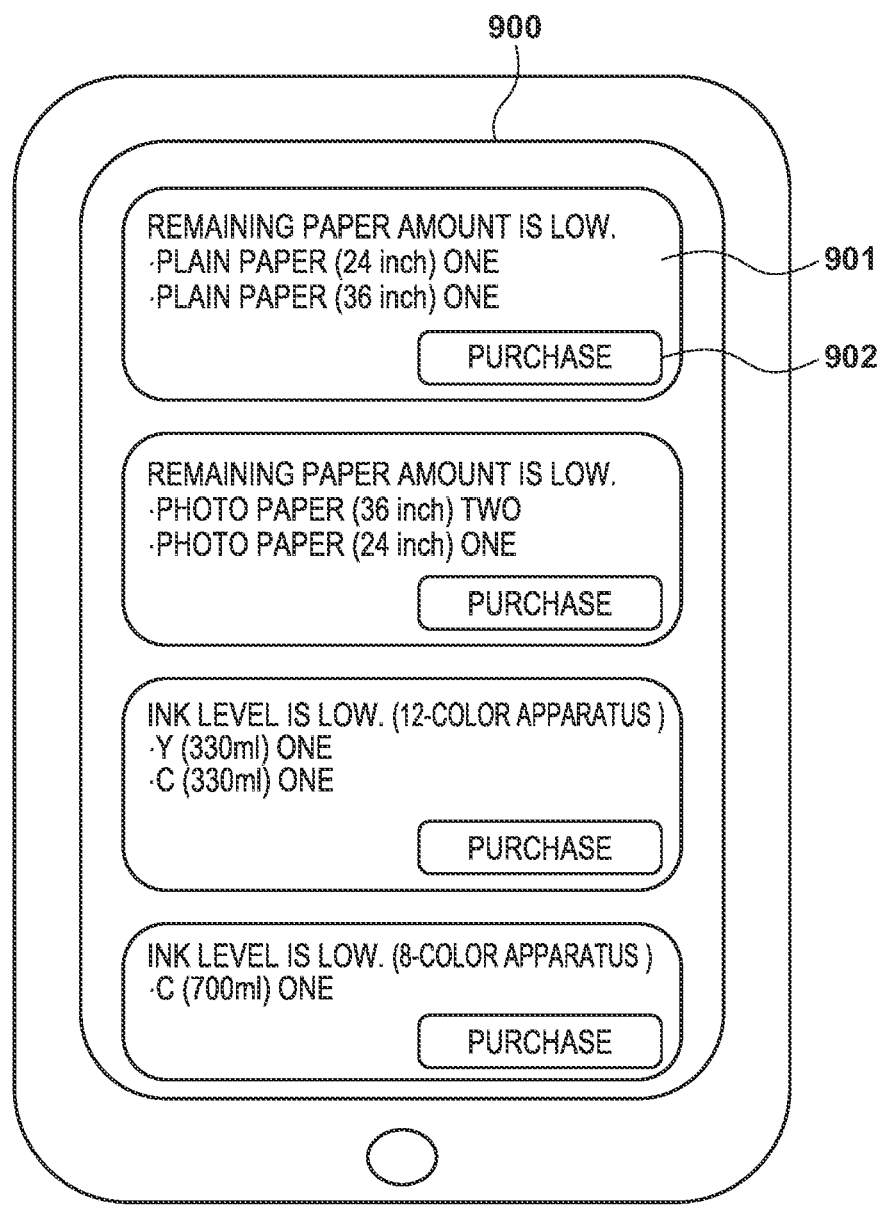
FIG. 12 is a view showing a screen displayed in a notification destination terminal.

FIG. 12 is a view showing an example of a group purchase information display screen when executing notification processing for each group assigned with the notification ID 700 displayed on a display 309 of a notification destination terminal 104. A screen 900 is a screen when a management PC 102 makes a notification by push email like a push notification. In a notification message 901, notification contents 701 included in the purchase information notified from the management PC 102 and a button 902 are displayed. The button 902 is associated with a consumable purchase site URL 702. When the button 902 is pressed, the notification destination terminal 104 accesses a consumable purchase site 106. Note that the notification message 901 may include only the notification contents 701, and the consumable purchase site URL 702 may directly be displayed.

As described above, according to this embodiment, resource information acquired from each image output apparatus is grouped based on a resource name 602 and ink configuration information 604, thereby generating purchase information. Then, the user is notified of the information summarized for each group. Since a purchase button is also displayed for each group, it is possible to improve the convenience of a purchase operation for each resource name 602 by the user.

Third Embodiment

In this embodiment, points different from the first and second embodiments will be described below. In the first embodiment, in the processing shown in FIG. 10 or 11, a notification of the purchase information grouped for each resource name 602, each piece of ink configuration information 604, and each consumable purchase site URL 702 is collectively made. In this embodiment, a notification of both purchase information for each group and purchase information which is not grouped is made. That is, the processes in steps S212 to S215 of FIG. 10 and those in steps S303 and S304 of FIG. 11 in the first embodiment are executed, and data for making a notification of purchase information grouped for each consumable purchase site URL 702 is generated. On the other hand, data for making a notification of purchase information is generated based on each piece of resource information in a remaining resource amount information DB 500 shown in FIG. 6. Then, a CPU 300 generates notification data by combining those data, and notifies a notification destination terminal 104 of purchase information by a purchase information notification unit 507.

FIG. 13 is a view showing an example of a display screen which includes purchase information for each group and purchase information that is not grouped, and is displayed on a display 309 of the notification destination terminal 104. A screen 1000 is a screen when a management PC 102 makes a notification by email. The screen 1000 includes notification message text 1001 formed by the pieces of purchase information which are not grouped, and notification message text 1002 for the respective groups, which is formed by pieces of purchase information for the respective groups. The notification message text 1001 corresponds to data each for making a notification of purchase information and each generated from each piece of resource information in the remaining resource amount information DB 500, and shortage information and purchase destination URL information are displayed for each printer and each resource name. The notification message text 1002 corresponds to data each for making a notification of purchase information and each generated by executing the processes in steps S303 and S304. Note that the screen 1000 may include information other than that shown in FIG. 13. Although this embodiment has explained a notification by email, the present invention is not limited to polling email, and a notification may be made by push email like a push notification.

As described above, according to this embodiment, the resource information acquired from each image output apparatuses is grouped based on a resource name 602 and ink configuration information 604, and a notification of the information summarized for each group is made while the shortage information and the purchase destination URL information are displayed for each printer and each resource name. This arrangement can improve the user convenience in purchase and can make the user recognize the shortage information for each printer.

Fourth Embodiment

In this embodiment, points different from the first to third embodiments will be described below. The first embodiment assumes that the pieces of consumable purchase site information held in the consumable purchase site information storage units 404 of the image output apparatuses in the group assigned with the notification ID 700 match each other in step S213 of FIG. 10. However, in this case, the consumable purchase site information held in the consumable purchase site information storage unit 404 may be different for each image output apparatus. This applies to, for example, a case in which update of the consumable purchase site information held in the consumable purchase site information storage unit 404 of a given image output apparatus is delayed.

Figure 14:
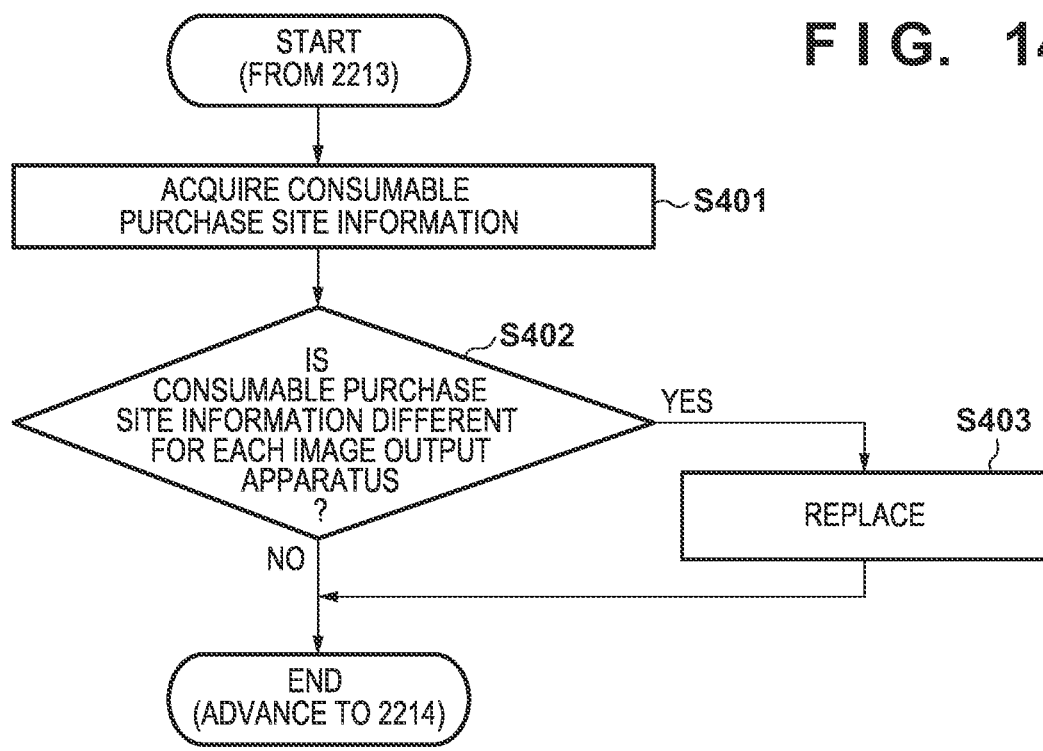
FIG. 14 is a flowchart illustrating processing executed by a management PC.

FIG. 14 is a flowchart illustrating processing when different consumable purchase site information is registered for each image output apparatus in step S213. The processing shown in FIG. 14 is implemented when, for example, a CPU 300 reads out a program stored in a ROM 301 into a RAM 302 and executes it. In step S401, the CPU 300 acquires, by a consumable purchase site information acquisition unit 506, information held in a consumable purchase site information storage unit 404 of each image output apparatus linked with resource information in a group.

In step S402, the CPU 300 determines whether the pieces of consumable purchase site information acquired in step S401 are different among the image output apparatuses or match each other. If it is determined that the pieces of information are different, in step S403 the CPU 300 acquires, as information for a consumable purchase site URL 702, the matched pieces of consumable purchase site information, the number of which is largest, among the pieces of consumable purchase site information acquired in step S401, and then ends the processing shown in FIG. 14. On the other hand, if it is determined that the pieces of information match each other, the processing shown in FIG. 14 ends. Note that if it is determined that the pieces of information match each other, the consumable purchase site information is acquired from the consumable purchase site information storage unit 404 of one of the image output apparatuses, as described in the first embodiment.

As described above, according to this embodiment, the resource information acquired from each image output apparatus is grouped based on a resource name 602 and ink configuration information 604, thereby generating purchase information and making a notification of it. The user is notified of, as the consumable purchase site URL, the matched pieces of consumable purchase site information, the number of which is largest, among the pieces of consumable purchase site information stored in the image output apparatuses in the group. With this arrangement, for example, even if the pieces of consumable purchase site information held in the consumable purchase site information storage units 404 of some image output apparatuses are old, it is possible to prevent a notification of such consumable purchase site information from being made.

Fifth Embodiment

In this embodiment, points different from the first to fourth embodiments will be described below. In the first embodiment, if the acquisition of the information held in the feed paper information storage unit 402 of the image output apparatus 100 in step S104 of FIG. 9 fails, a notification of a failure in the acquisition of the information of the image output apparatus 100 is made in step S108. However, it may be impossible to acquire the above information due to constraints on the functions of the image output apparatus 100. In this case, in this embodiment, if information for specifying feed paper used to execute printing last time is stored as a print history in a print execution unit 403 of an image output apparatus 100, feed paper information is acquired from the print history information, instead of making a notification of a failure in the acquisition of the information of the image output apparatus 100.

Figure 15:
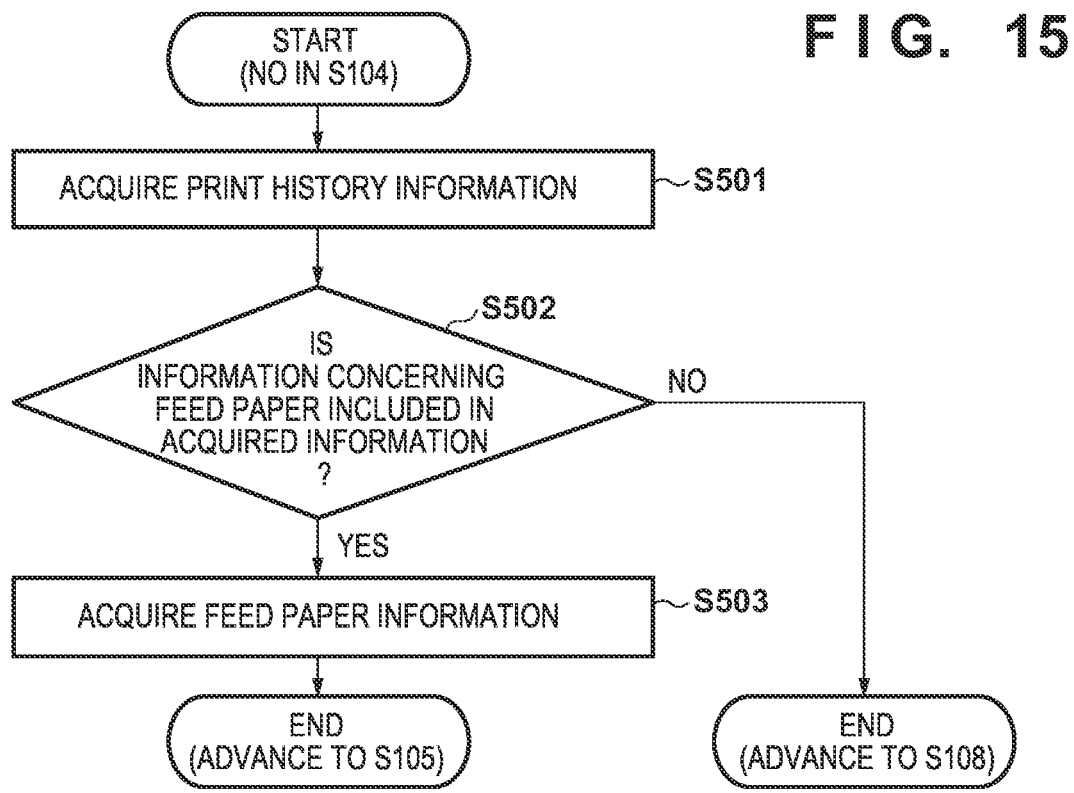
FIG. 15 is a flowchart illustrating processing executed by a management PC.

FIG. 15 is a flowchart illustrating processing of deciding feed paper information when it is determined in step S104 of FIG. 9 that acquisition of feed paper information from the image output apparatus 100 does not succeed. The processing shown in FIG. 15 is implemented when, for example, a CPU 300 reads out a program stored in a ROM 301 into a RAM 302 and executes it. The processing shown in FIG. 15 starts when it is determined in step S104 of FIG. 9 that acquisition of feed paper information does not succeed.

In step S501, the CPU 300 acquires, by a feed paper information acquisition unit 504, print history information from the print execution unit 403 of the image output apparatus 100. In step S502, the CPU 300 determines whether the print history information acquired in step S501 includes information concerning feed paper. If it is determined that the information concerning the feed paper is included, the CPU 300 extracts, in step S503, by the feed paper information acquisition unit 504, feed paper information from the print history information acquired in step S501. After that, the processing shown in FIG. 15 ends, and the process advances to step S105 of FIG. 9. On the other hand, if it is determined that the information concerning the feed paper is not included, the processing shown in FIG. 15 ends, and the process advances to step S108 of FIG. 9 to make a notification of a failure in the acquisition of the information of the image output apparatus 100.

As described above, according to this embodiment, even if it is impossible to acquire the feed paper information held in a feed paper information storage unit 402 of the image output apparatus, the feed paper information can be acquired from the print history information stored in the print execution unit 403, and registered in a remaining resource amount information DB 500.

Even if the acquisition of the information held in the feed paper information storage unit 402 of the image output apparatus 100 fails due to a reason other than the above one, for example, due to a non-feed state or a shortage of the remaining paper amount in the image output apparatus 100, the feed paper information may be extracted from the print history information described in this embodiment, as a matter of course. As another arrangement, information for uniquely identifying the image output apparatus 100, such as a serial number or a housing name assigned in an operation for individual management and information for identifying a mounting position of feed paper such as a roll of the upper stage or a roll of the second stage in a case including roll paper feed ports of a plurality of stages may be combined like an example of "{printer A}_{roll paper feed port 1}", thereby generating feed paper information.

Sixth Embodiment

In this embodiment, points different from the first to fifth embodiments will be described below. In the first embodiment, the number of pieces of information is counted for each resource name 602 and each size 605 in step S212 of FIG. 10. If the image output apparatus 100 is configured to feed paper of the same resource name 602 and size 605 from a plurality of positions, pieces of information with the same image output apparatus identification information 603 may be included in the count result. For example, in FIGS. 6 and 7, in the group assigned with notification ID-B, printers with the resource name 602 "photo paper" and the size 605 "36 inches" are printers 1 and 2. If a plurality of paper feed positions of photo paper (36 inches) are arranged, pieces of feed paper information of two resource IDs 600 may be acquired in step S103 of FIG. 9. In this case, if an order is placed based on the count result obtained in step S212 of FIG. 10, excessive ordering may occur.

Figure 16:
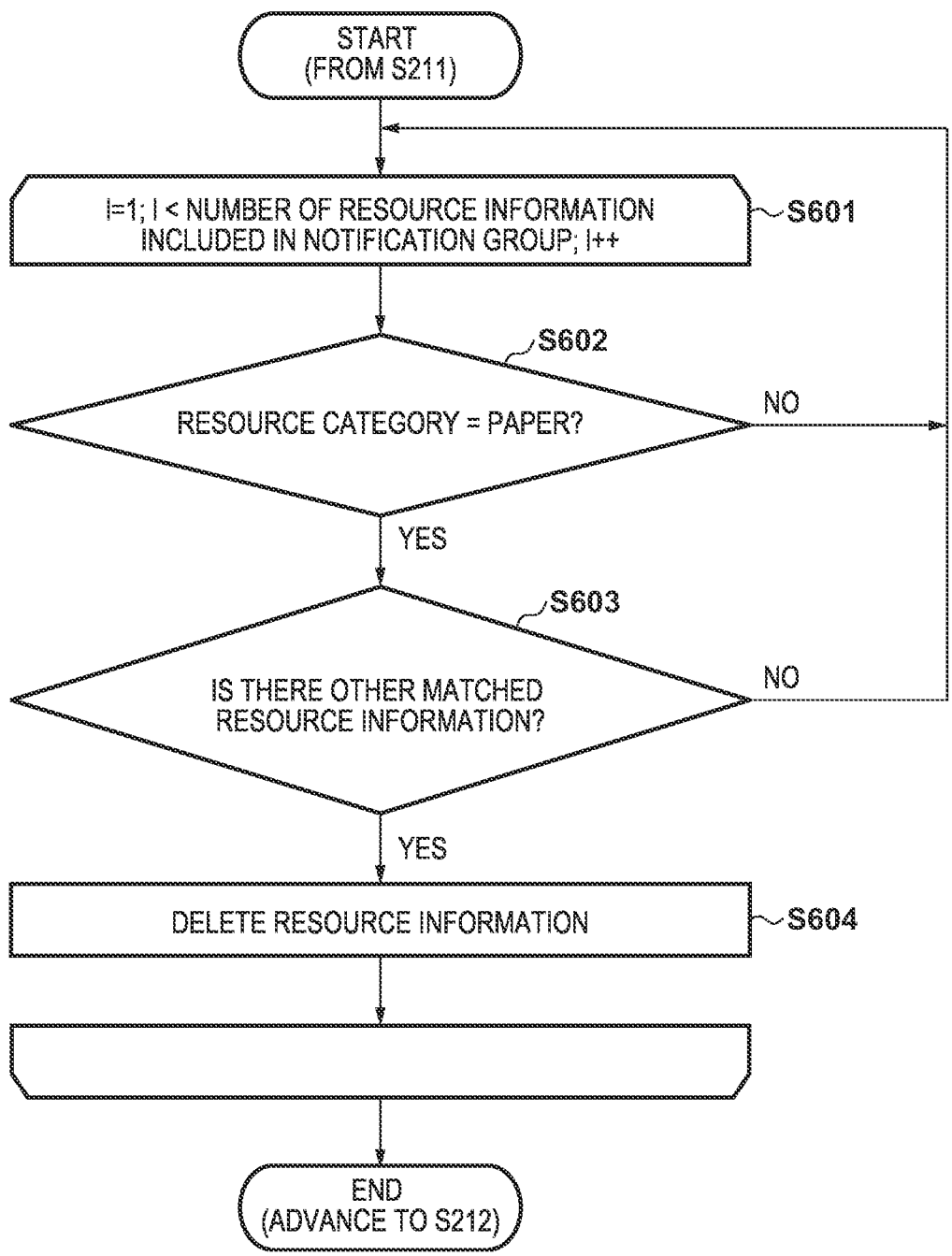
FIG. 16 is a flowchart illustrating processing executed by a management PC.

FIG. 16 is a flowchart illustrating processing when a plurality of pieces of feed paper information which are identical to each other exist in an image output apparatus 100 in step S212 of FIG. 10. The processing shown in FIG. 16 is implemented when, for example, a CPU 300 reads out a program stored in a ROM 301 into a RAM 302 and executes it. The processing shown in FIG. 16 starts after step S212 of FIG. 10.

In step S601, the CPU 300 ensures a variable l corresponding to the total number of pieces of resource information included in a group assigned with a notification ID 700 in a memory area of the RAM 302 or the like, and sets l=1 as an initial value. That is, the first piece of resource information is set as a processing target. Processes in steps S602 to S604 are repeated until the variable l is incremented to reach the total number of pieces of resource information.

In step S602, the CPU 300 determines whether a resource category 601 included in the resource information is paper. If it is determined that the resource name 602 is not paper, the CPU 300 increments the variable l in step S601, and repeats the processing from step S602. On the other hand, if it is determined that the resource name 602 is paper, other resource information whose resource name 602, image output apparatus identification information 603, and size 605 match those of the resource information exists in the group. If it is determined the other resource information does not exist, the CPU 300 increments the variable l in step S601, and repeats the processing from step S602. If it is determined in step S603 that the other resource information exists, the CPU 300 deletes the matched other resource information from the group, increments the variable 1 in step S601, and repeats the processing from step S602. If the value of the variable l reaches the total number of pieces of resource information included in the group, the processing shown in FIG. 16 ends.

As described above, according to this embodiment, when generating purchase information for each group from the resource information, resource information whose resource name 602 and size 605 match those of other resource information can be deleted in the same image output apparatus, thereby preventing excessive ordering.

Seventh Embodiment

In this embodiment, points different from the first to sixth embodiments will be described below. In this embodiment, when a notification destination terminal 104 accesses a consumable purchase site 106, information for specifying a consumable of a resource name 602, a size 605, and the like included in notification contents 701 of purchase information and the quantity of the consumable are transmitted to the consumable purchase site 106. Based on the transmitted information, the consumable purchase site 106 sets the initial value of an order quantity on an order request screen. With this arrangement, it is possible to reduce the load and time for a totalization operation up to an order request.

Figure 17A:
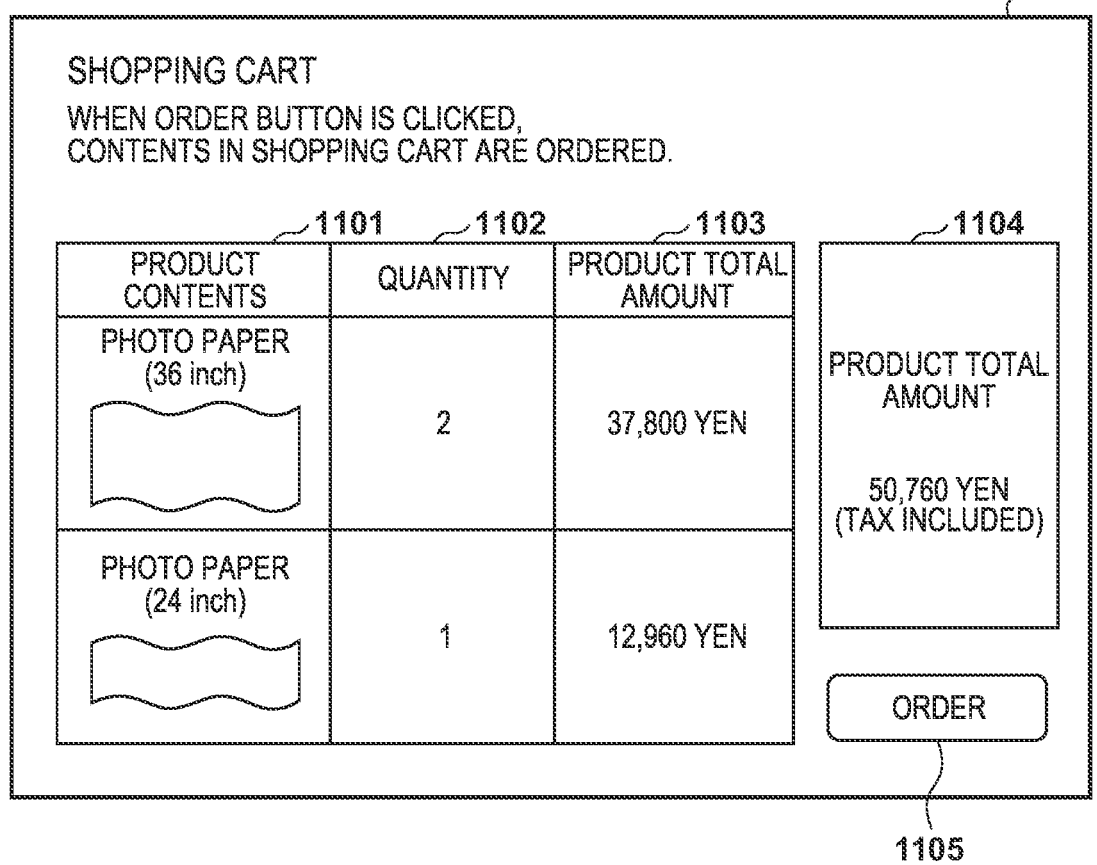
FIGS. 17A, 17B, and 17C are a view and flowcharts showing a screen displayed in a notification destination terminal.
Figure 17B:
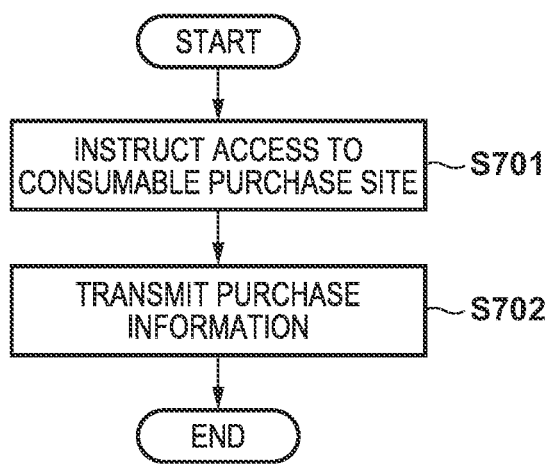

FIG. 17B is a flowchart illustrating processing of transmitting notified purchased information to the consumable purchase site 106, which is executed by the notification destination terminal 104. The processing shown in FIG. 17B is implemented when, for example, a CPU 300 reads out a program stored in a ROM 301 into a RAM 302 and executes it. The processing shown in FIG. 17B is performed after display in the notification destination terminal 104 in FIG. 8A, 8B, 12, or 13.

In step S701, the CPU 300 accepts an access instruction to the consumable purchase site 106. The access instruction may be issued by, for example, pressing a button associated with information of a consumable purchase site URL 702.

In step S702, the CPU 300 transmits, to the consumable purchase site 106, purchase information based on notification data used to display the screen shown in FIG. 8A, 8B, 12, or 13. After that, the CPU 300 ends the processing shown in FIG. 17B.

Figure 17C:
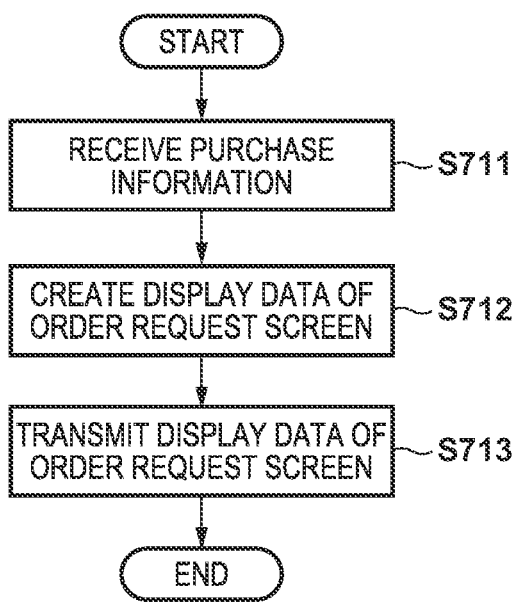

FIG. 17C is a flowchart illustrating processing of displaying an order request screen based on the purchase information, which is executed in the consumable purchase site 106. The processing shown in FIG. 17C is implemented when, for example, the CPU 300 reads out a program stored in the ROM 301 into the RAM 302 and executes it.

In step S711, the CPU 300 receives the purchase information from the notification destination terminal 104. In step S712, the CPU 300 creates display data of the order request screen based on the received purchase information. In step S713, the CPU 300 transmits the display data of the order request screen created in step S712 to the notification destination terminal 104 to display it. After that, the processing shown in FIG. 17C ends.

FIG. 17A is a view showing an example (shopping cart) of the order request screen displayed on a display 309 when accessing the consumable purchase site 106. As shown in FIG. 17A, product contents 1101 specified from the purchase information received from the notification destination terminal 104 and a quantity 1102 are displayed on an order request screen 1100. The product contents 1101 correspond to the resource name 602 and the size 605 in a group assigned with a notification ID 700, and the quantity 1102 corresponds to a count result in step S212. A subtotal 1103 indicating an amount calculated from the product contents 1101 and the quantity 1102 is also displayed on the order request screen 1100. A total amount indicating an amount obtained by totalizing the subtotals 1103 is displayed in a product total amount display portion 1104.

When an order button 1105 is pressed, order request processing is executed for the contents displayed on the order request screen 1100. The user may be able to edit the product contents 1101 and the quantity 1102. In this case, display of the subtotal 1103 and the product total amount display portion 1104 is updated in accordance with an edit result. Furthermore, if an order history is stored in the memory area of the consumable purchase site 106, the order history information may be displayed together on the order request screen 1100. With this arrangement, it is possible to prevent a duplicate order of a product ordered in the past. If duplicate order contents are included in the order history, a value obtained by subtracting the ordered quantity from the quantity 1102 may be displayed.

Figure 18:
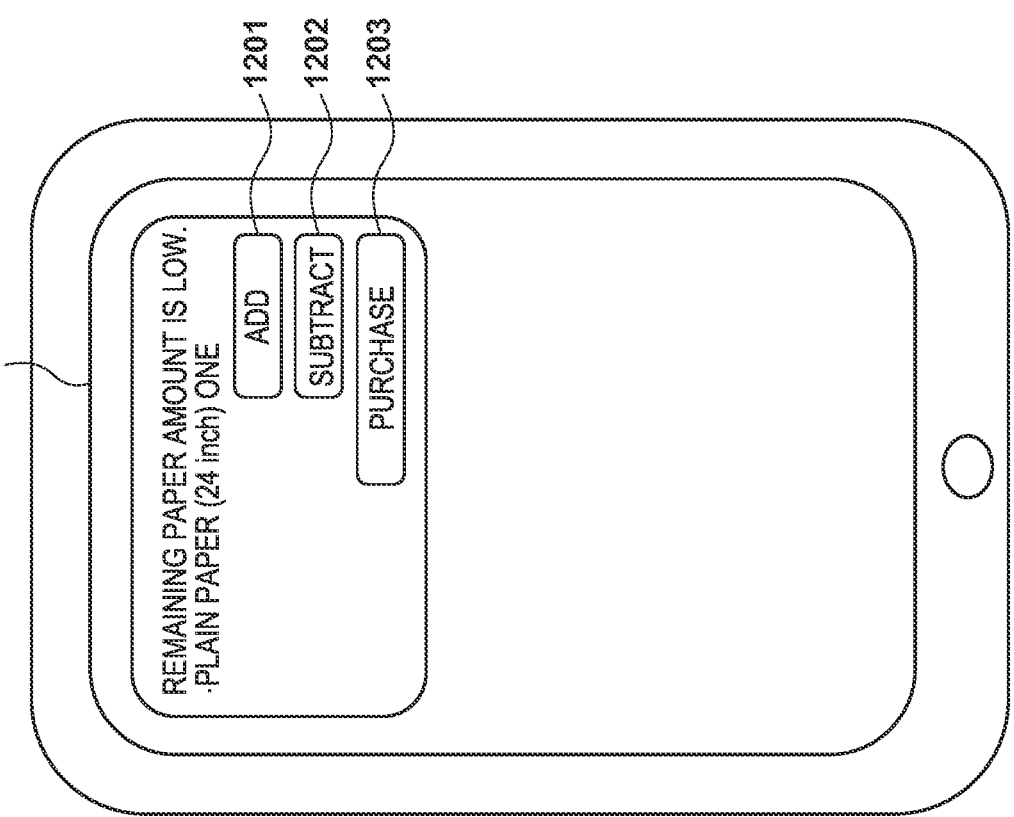
FIG. 18 is a view showing a screen displayed in the notification destination terminal.

On the other hand, it may be configured that the notification destination terminal 104 can edit, in advance, information included in the purchase information before display of the order request screen. FIG. 18 is a view showing an example of purchase information edit screen displayed on a display 309 of the notification destination terminal 104. As shown in FIG. 18, an edit screen 1200 includes a purchase quantity add button 1201 and a purchase quantity subtract button 1202 for changing the order quantity included in the purchase information. When a purchase button 1203 is pressed, the purchase information including the order quantity changed by the purchase quantity add button 1201 and the purchase quantity subtract button 1202 is transmitted to the consumable purchase site 106 in step S702. When the purchase button 1203 is pressed, the purchase information may be transmitted to the consumable purchase site 106 to automatically execute processing that is performed when the order button 1105 is pressed. That is, with this arrangement, display of the order request screen 1100 can be skipped.

As described above, according to this embodiment, if the notification destination terminal 104 accesses the consumable purchase site 106 after display in the notification destination terminal 104 as shown in FIG. 8A, 8B, 12, or 13, the contents of the display are displayed as an order request screen. With this arrangement, it is possible to further improve the user convenience until an order request is made.

Eighth Embodiment

In this embodiment, points different from the first to seventh embodiments will be described below. In the first embodiment, when displaying the purchase information in the notification destination terminal 104, the value of the size 605 is directly displayed. In this embodiment, order history information is stored in a consumable purchase site 106. Then, when displaying purchase information in a notification destination terminal 104, the order history information is acquired from the consumable purchase site 106, and if the order frequency of a resource name 602 included in the order history information is high, a value obtained by increasing the value of a size 605 by one step is displayed on a screen. With this arrangement, for a consumable having a high order frequency, it is possible to improve the cost performance.

Figure 19:
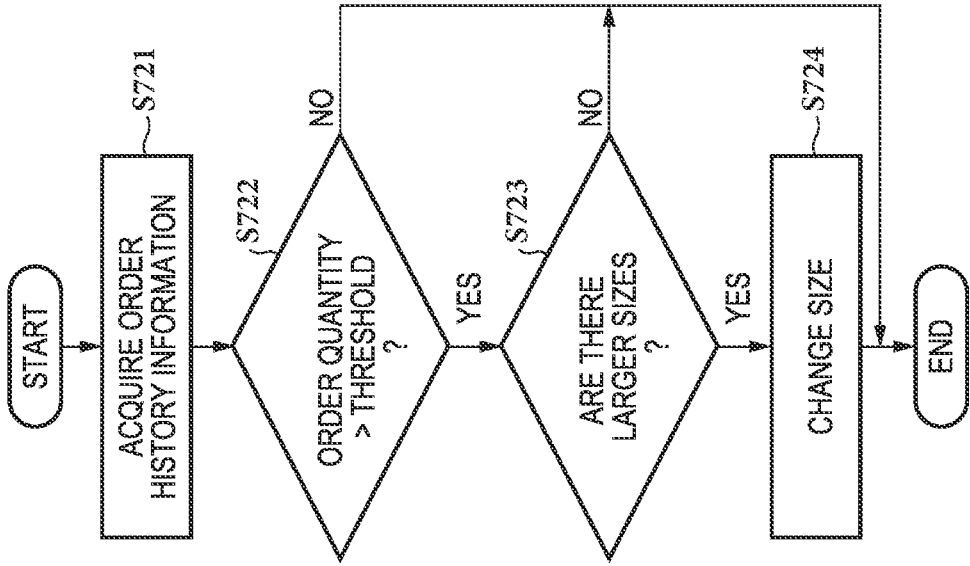
FIG. 19 is a flowchart illustrating processing executed by a notification destination terminal.

FIG. 19 is a flowchart illustrating processing of updating the size 605 included in the purchase information based on the order frequency when displaying the purchase information in the notification destination terminal 104. The processing shown in FIG. 19 is implemented when, for example, a CPU 300 reads out a program stored in a ROM 301 into a RAM 302 and executes it. The processing shown in FIG. 19 starts when, for example, the purchase information is displayed in the notification destination terminal 104 after step S305 of FIG. 11.

In step S721, the CPU 300 acquires order history information from the consumable purchase site 106. In step S722, based on the order history information corresponding to the resource name 602 and the size 605 included in the purchase information, the CPU 300 determines whether an order quantity during a predetermined period is larger than a threshold. If the order quantity is equal to or smaller than the threshold, the processing shown in FIG. 19 ends.

If it is determined in step S722 that the order quantity is larger than the threshold, it is determined in step S723 whether a size of a value larger than the value (for example, the width value) of the size 605 exists with respect to the resource name 602. If there is no such size, the processing shown in FIG. 19 ends. On the other hand, if there is such size, the value of the size 605 targeted in step S722 is changed in step S724 to a size which is larger by one step. For example, if there are a plurality of sizes larger than the size 605, the size 605 is changed to a size closest to the size 605 among the sizes. After that, the processing shown in FIG. 19 ends.

As described above, according to this embodiment, if a consumable has a high order frequency, a consumable of a larger size can be set as purchase information, thereby improving the user convenience and cost performance.

Ninth Embodiment

In this embodiment, points different from the first to eighth embodiments will be described below. In the first embodiment, the number of pieces of information is counted for each resource name 602 and each size 605 in step S212 of FIG. 10. In this embodiment, if there is a stock for a corresponding resource, a counted number is updated based on a stock quantity to generate purchase information. With this arrangement, it is possible to perform an appropriate purchase operation in accordance with the stock quantity.

Figure 21:
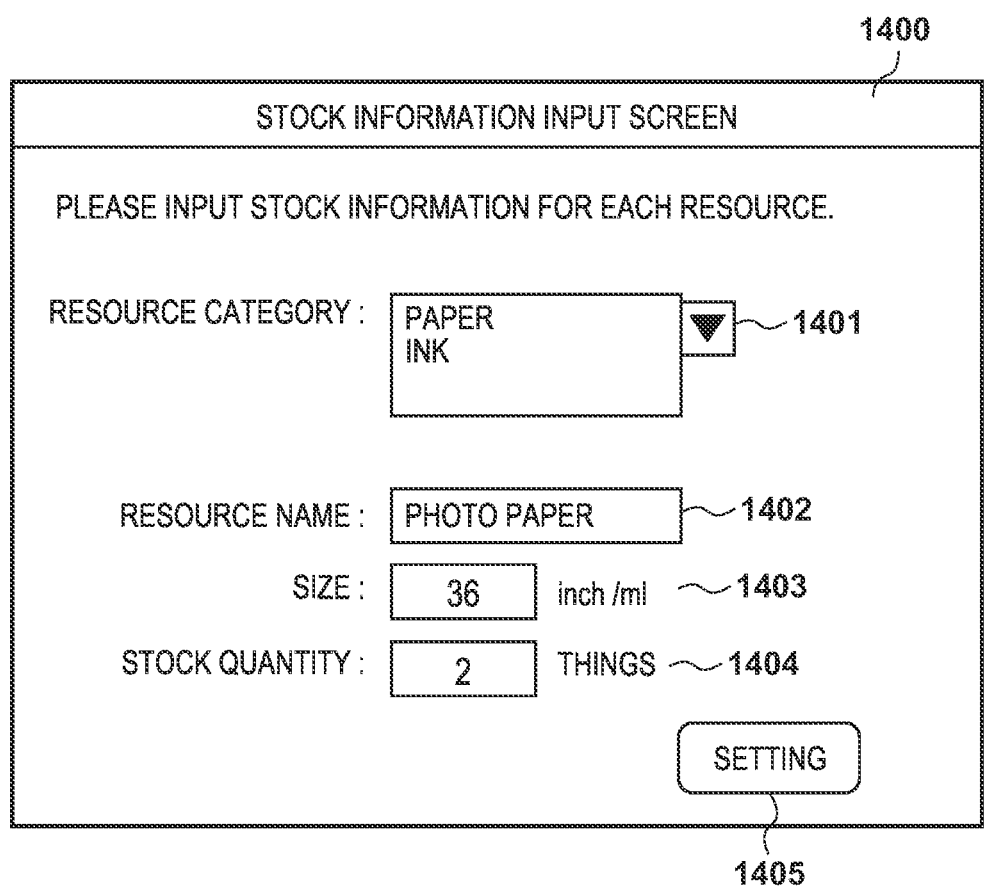
FIG. 21 is a view showing a screen displayed in a management PC.

FIG. 20 is a table showing an example of a remaining resource amount information DB 500 according to this embodiment. In this embodiment, the remaining resource amount information DB 500 includes a parameter of a stock quantity 1300. The parameter of the stock quantity 1300 is set via a stock information input screen 1400 shown in FIG. 21. A screen shown in FIG. 21 is displayed on, for example, a management PC 102.

A dropdown list 1401 of the stock information input screen 1400 can accept selection of a resource category 601. A resource name 602 is input to an input region 1402, a size 605 is input to an input region 1403, and the stock quantity 1300 is input to an input region 1404. If the resource category 601 is selected from the dropdown list 1401, and data are input to the input regions 1402 to 1404, and a setting button 1405 is pressed, contents of the stock information input screen 1400 are reflected on the remaining resource amount information DB 500. The stock information input screen 1400 is not limited to the example shown in FIG. 21. For example, the stock information input screen 1400 may be configured to allow the user to collectively set stock quantities for a plurality of pieces of resource information or to input only some parameters of the remaining resource amount information DB 500.

Figure 22:
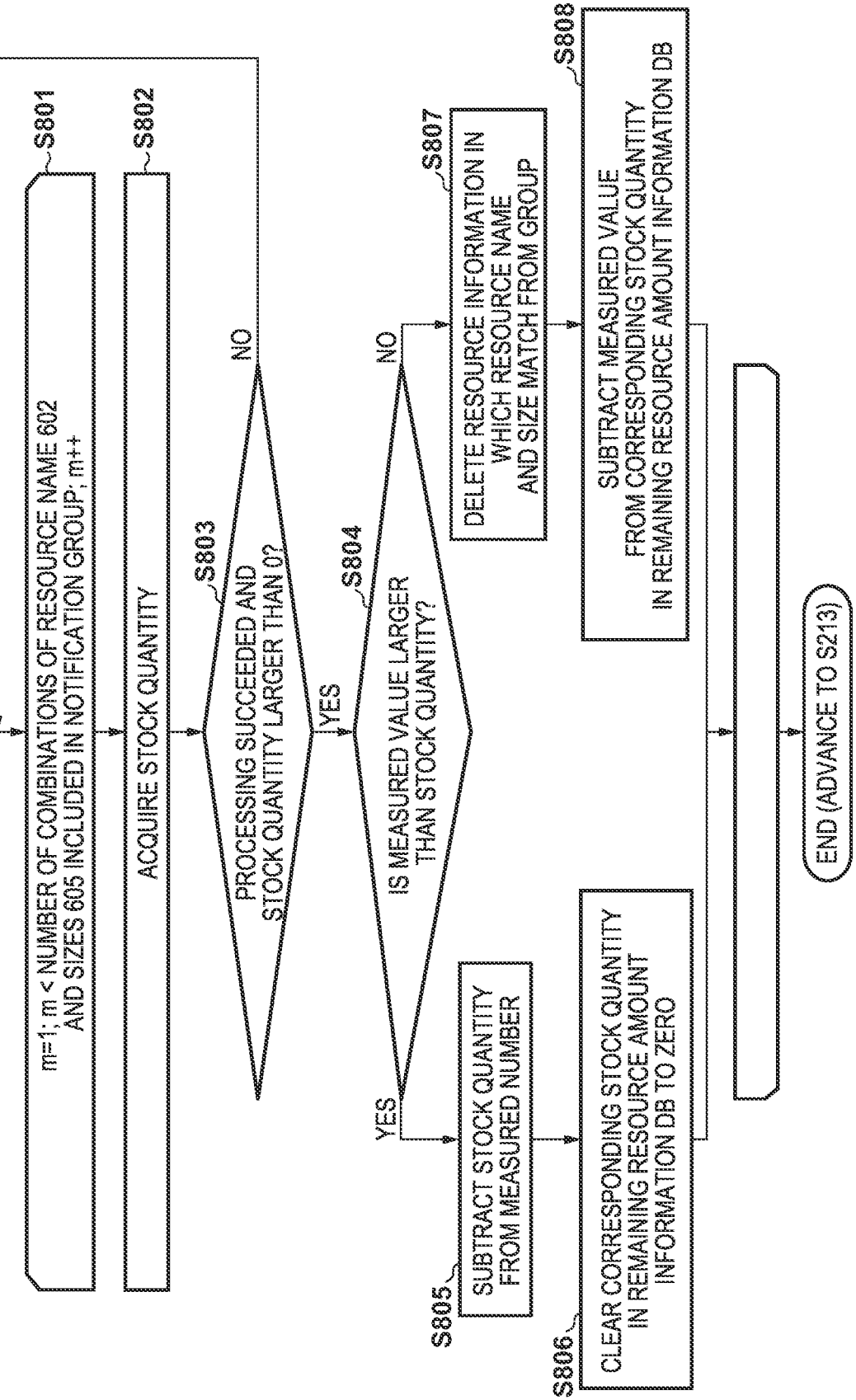
FIG. 22 is a flowchart illustrating processing executed by the management PC.

FIG. 22 is a flowchart illustrating processing of updating the counted number based on the stock quantity in step S212 of FIG. 10. The processing shown in FIG. 22 is implemented when, for example, a CPU 300 reads out a program stored in a ROM 301 into a RAM 302 and executes it. The processing shown in FIG. 22 starts after, for example, step S212 of FIG. 10.

In step S801, the CPU 300 ensures a variable m corresponding to the number of combinations of resource names 602 and sizes 605 in a memory area of the RAM 302 or the like, and sets m=1 as an initial value. That is, the first combination of the resource name 602 and the size 605 is set as a processing target. Processes in steps S802 to S808 are repeated until the variable m is incremented to reach the number of combinations of the resource names 602 and sizes 605.

In step S802, the CPU 300 acquires the stock quantity 1300 from the remaining resource amount information DB 500. In step S803, the CPU 300 determines whether a condition that the processing in step S802 succeeds and the stock quantity 1300 is larger than 0 is satisfied. If it is determined that the condition is not satisfied, the CPU 300 increments the variable m in step S801, and repeats the processing from step S803. If it is determined that the condition is satisfied, the process advances to step S804.

In step S804, the CPU 300 determines whether the counted number in step S212 is larger than the stock quantity 1300. If it is determined that the counted number is larger than stock quantity 1300, the CPU 300 subtracts, in step S805, the stock quantity 1300 acquired in step S802 from the counted number in step S212, and uses the subtraction result as a counted number in subsequent processing. In step S806, the CPU 300 clears the corresponding stock quantity 1300 in the remaining resource amount information DB 500 to zero. As described above, if the counted number is larger than the stock quantity, that is, the purchase quantity is larger than the stock quantity, subtraction of the stock quantity is performed, and it is thus possible to prevent excessive ordering to obtain an appropriate purchase quantity.

On the other hand, if it is determined in step S804 that the counted number is equal to or smaller than the stock quantity 1300, the CPU 300 deletes, in step S807, resource information corresponding to the stock quantity 1300 from a group assigned with a notification ID 600. In step S808, the CPU 300 subtracts the counted number in step S212 from the corresponding stock quantity 1300 in the remaining resource amount information DB 500. As described above, if the counted number is equal to or smaller than the stock quantity, that is, the stock quantity is larger, the information is deleted from the purchase information, and it is thus possible to prevent unnecessary purchase. If the processes in steps S802 to S808 are performed the number of times corresponding to the number of combinations of the resource names 602 and sizes 605, the processing in step S213 is performed.

As described above, according to this embodiment, based on pieces of resource information each concerning a remaining consumable amount and acquired from each of a plurality of image output apparatuses, a necessary quantity or amount is totalized for each consumable type (for example, steps S204 to S212 of FIG. 10). The information is grouped for each consumable type, and an appropriate purchase operation according to a stock quantity can be performed for each consumable type.

The present invention is not limited to the above-described embodiments, and various changes and modifications can be made without departing from the spirit and scope of the present invention. To apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-228615, filed Dec. 18, 2019, and Japanese Patent Application No. 2020-177446, filed Oct. 22, 2020, which are hereby incorporated by reference herein in their entirety.

What is claimed is:

1. An information processing apparatus capable of communicating with an image output apparatus, comprising:
   at least one processor; and
   at least one memory storing instructions that, when executed by the at least one processor, cause the information processing apparatus to perform the functions of
      an acquisition unit that acquires resource information concerning a remaining amount of a consumable and indicating a type of the consumable, from the image output apparatus;
      a generation unit that generates notification information indicating a quantity or amount of the consumable based on the resource information acquired from the image output apparatus; and
      a notification unit that makes a notification of the notification information generated by the generation unit,
   wherein the acquisition unit acquires the resource information of a plurality of types of consumables from each of a first image output apparatus and a second image output apparatus,
   the generation unit generates the corresponding notification information for each of the plurality of types based on the acquired resource information, and
   the notification unit makes a notification of the notification information for each of the plurality of types,
   wherein a notification based on identification information of the image output apparatus and identification information of a predetermined mounting position which mounts the consumable and is provided in the image output apparatus is made in the information processing apparatus, in a case where the resource information is not acquired with respect to the predetermined mounting position.

2. The apparatus according to claim 1, wherein the notification unit makes a notification of the notification information while making, in association with the image output apparatus, a notification of the resource information used to generate the notification information.

3. The apparatus according to claim 1, wherein the instructions further cause the information processing apparatus to perform the functions of a second acquisition unit configured to acquire purchase site information indicating a consumable purchase destination,
   wherein the notification unit makes a notification of the notification information together with the purchase site information.

4. The apparatus according to claim 3, wherein the second acquisition unit acquires the purchase site information from each of the plurality of image output apparatuses.

5. The apparatus according to claim 4, wherein the notification unit makes a notification of a largest number of pieces of purchase site information among the pieces of purchase site information respectively acquired from the plurality of image output apparatuses.

6. The apparatus according to claim 3, wherein the notification unit makes a notification of the notification information grouped for each piece of purchase site information.

7. The apparatus according to claim 3, wherein the purchase site information includes access information for accessing the consumable purchase destination.

8. The apparatus according to claim 1, wherein the acquisition unit acquires the resource information based on history information stored in the image output apparatus.

9. The apparatus according to claim 1, wherein the instructions further cause the information processing apparatus to perform the functions of a third acquisition unit configured to acquire stock information for each piece of resource information indicating that the remaining amount of the consumable is smaller than a threshold,
   wherein the notification unit makes a notification of the notification information on which the stock information is reflected.

10. An information processing system comprising an information processing apparatus, an image output apparatus, and a terminal,
   the information processing apparatus including
   at least one processor; and
   at least one memory storing instructions that, when executed by the at least one processor of the information processing apparatus, cause the information processing apparatus to perform the functions of
      an acquisition unit that acquires resource information concerning a remaining amount of a consumable and indicating a type of the consumable, from the image output apparatus;
      a generation unit that generates notification information indicating a quantity or amount of the consumable based on the resource information acquired from the image output apparatus, and
      a transmission unit that transmits, to the terminal, the notification information generated by the generation unit, and the terminal including at least one processor, and at least one memory storing instructions that, when executed by the at least one processor of the terminal, cause the terminal to perform the functions of a notification unit that makes a notification of the notification information transmitted from the information processing apparatus, wherein the acquisition unit acquires the resource information of a plurality of types of consumables from each of a first image output apparatus and a second image output apparatus, the generation unit generates the corresponding notification information for each of the plurality of types based on the acquired resource information, and the notification unit makes a notification of the notification information for each of the plurality of types, wherein a notification based on identification information of the image output apparatus and identification information of a predetermined mounting position which mounts the consumable and is provided in the image output apparatus is made in the information processing apparatus, in a case where the resource information is not acquired with respect to the predetermined mounting position.

11. The system according to claim 10, wherein the information processing system includes a purchase site.

12. The system according to claim 11, wherein after displaying the notification information, the notification unit accesses the purchase site in response to an instruction from a user, the purchase site includes at least one processor, and at least one memory storing instructions that, when executed by the at least one processor of the purchase site, cause the purchase site to perform the function of a second transmission unit that transmits, to the terminal, display data for displaying an order request screen in response to the access from the terminal, and the notification unit displays the order request screen based on the display data.

13. The system according to claim 12, wherein the instruction from the user includes a change of the quantity or amount of the consumable included in the notification information.

14. The system according to claim 11, wherein the at least one memory of the purchase site stores an order history for each user, the instructions executed by the at least one processor of the terminal further cause the terminal to perform the functions of a second acquisition unit that acquires, upon receiving the notification information, the order history from the purchase site, and a change unit that changes the notification information based on the acquired order history, and the notification unit makes a notification of the notification information changed by the change unit.

15. The system according to claim 14, wherein the change unit changes a size of the consumable included in the notification information.

16. A method executed by an information processing apparatus capable of communicating with an image output apparatus, comprising:

acquiring resource information concerning a remaining amount of a consumable and indicating a type of the consumable, from the image output apparatus;

generating notification information indicating a quantity or amount of the consumable based on the resource information acquired from the image output apparatus; and making a notification of the generated notification information, wherein in the acquiring, the resource information of a plurality of types of consumables is acquired from each of a first image output apparatus and a second image output apparatus, in the generating, the corresponding notification information is generated for each of the plurality of types based on the acquired resource information, in the making the notification, a notification of the notification information for each of the plurality of types is made, and wherein a notification based on identification information of the image output apparatus and identification information of a predetermined mounting position which mounts the consumable and is provided in the image output apparatus is made in the information processing apparatus, in a case where the resource information is not acquired with respect to the predetermined mounting position.

* * * * *